(12) United States Patent
Oneda et al.

(10) Patent No.: US 6,519,052 B1
(45) Date of Patent: Feb. 11, 2003

(54) IMAGE PROCESSING METHOD AND APPARATUS TO SELECT A DATA COMPRESSION METHOD ACCORDING TO A SIZE OF AN OUTPUT IMAGE

(75) Inventors: Shogo Oneda, Urayasu (JP); Takahiro Yagishita, Yokohama (JP); Yukiko Yamazaki, Yokohama (JP); Nekka Matsuura, Ohta-ku (JP)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/401,503

(22) Filed: Sep. 22, 1999

(30) Foreign Application Priority Data

Sep. 22, 1998 (JP) ............................................. 10-268508

(51) Int. Cl.[7] .............................................. G06E 15/00
(52) U.S. Cl. ..................... 358/1.16; 358/1.12; 358/1.17; 358/1.18; 382/233; 382/239; 382/244; 382/245
(58) Field of Search ............................... 358/1.16, 1.12, 358/1.17, 1.18, 501, 523, 524, 528, 537, 539, 448, 449, 451, 426, 433; 382/233, 239, 244, 245, 246, 248, 277, 232; 348/394.1, 395.1, 397.1, 404.1

(56) References Cited

U.S. PATENT DOCUMENTS 5,831,751 A * 11/1998 Ohneda et al.

FOREIGN PATENT DOCUMENTS

JP 2618988 * 3/1997

OTHER PUBLICATIONS

Satoshi Ohuchi et al., Japan dissertation entitled "Segmentation Method for Documents Containing Text/Picture (Screened Halftone, Continuous Tone)," D–II, vol. J75–D–II No. 1, 1992, pp. 39–47 with English abstract.*
U.S. patent application Ser. No. 09/024,708, filed Feb. 17, 1998, pending.
U.S. patent application Ser. No. 09/073,873, filed May 7, 1998, pending.
U.S. patent application Ser. No. 09/085,714, filed May 28, 1998, pending.
U.S. patent application Ser. No. 09/098,734, filed Jun. 18, 1998 allowed.
U.S. patent application Ser. No. 09/282,456, filed Mar. 31, 1999, pending.
U.S. patent application Ser. No. 09/401,503, filed Sep. 22, 1999, pending.
U.S. patent application Ser. No. 09/565,545, filed May 5, 2000, pending.

* cited by examiner

*Primary Examiner*—Mark Wallerson
*Assistant Examiner*—Twyler Lamb
(74) *Attorney, Agent, or Firm*—Oblon, Spivak, McClelland, Maier & Neustadt, P.C.

(57) ABSTRACT

An image processing apparatus for inputting image data from an external image input device and outputting the inputted image data to an external image output device after processing the data, the image processing apparatus including a data compression device for compressing the inputted image data by a variable-length data compression method. An image data storing device stores the inputted image data therein. A control device controls the apparatus, such that, when a size of an output image of the inputted image data is larger than a predetermined size, the data compression device compresses the inputted image data by the variable-length data compression method and the image data storing device stores the compressed image data therein, and, when the output image of the inputted image data is equal to or smaller than the predetermined size, the image data storing device stores the inputted image data therein without data compression.

36 Claims, 17 Drawing Sheets

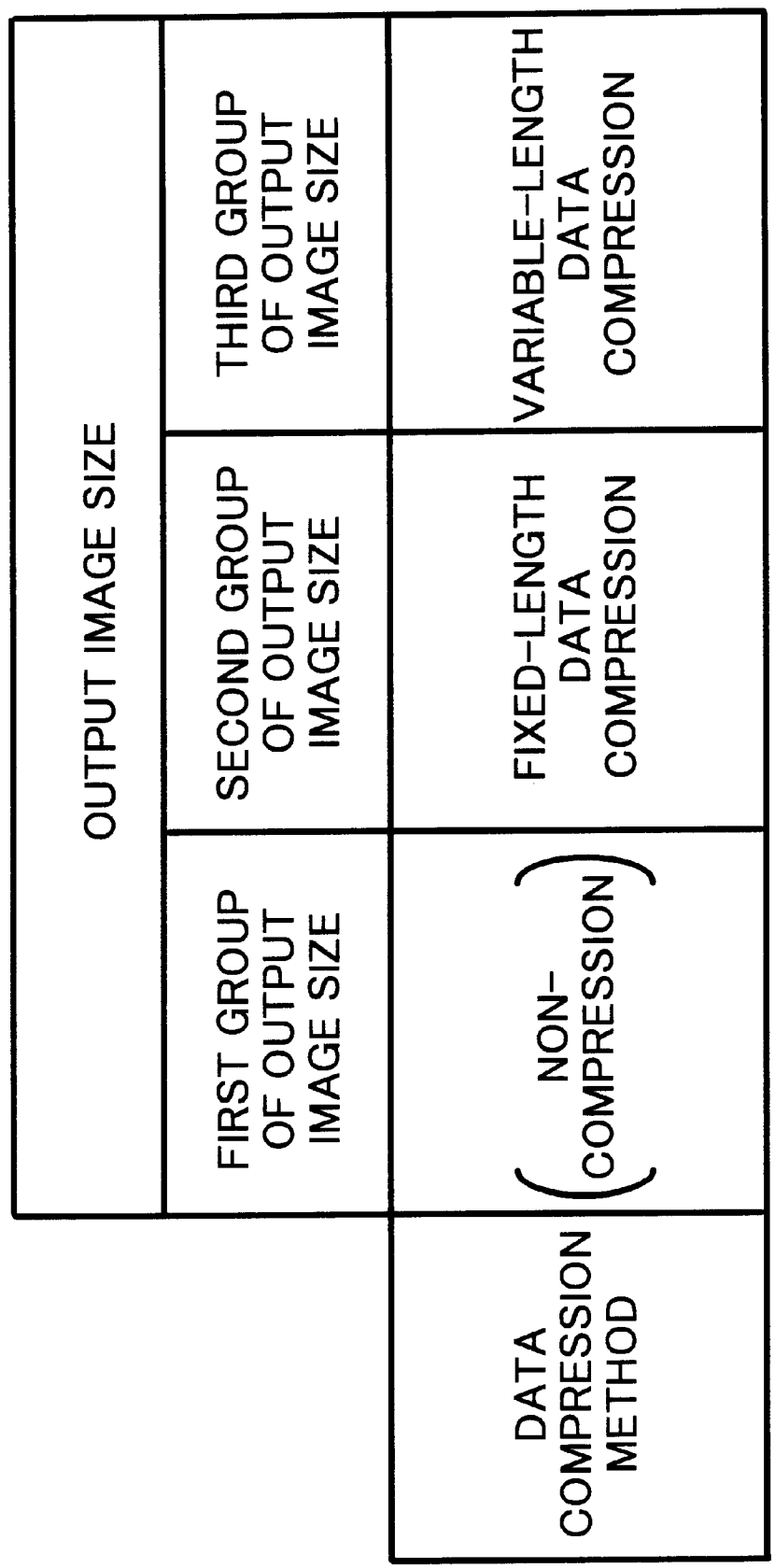

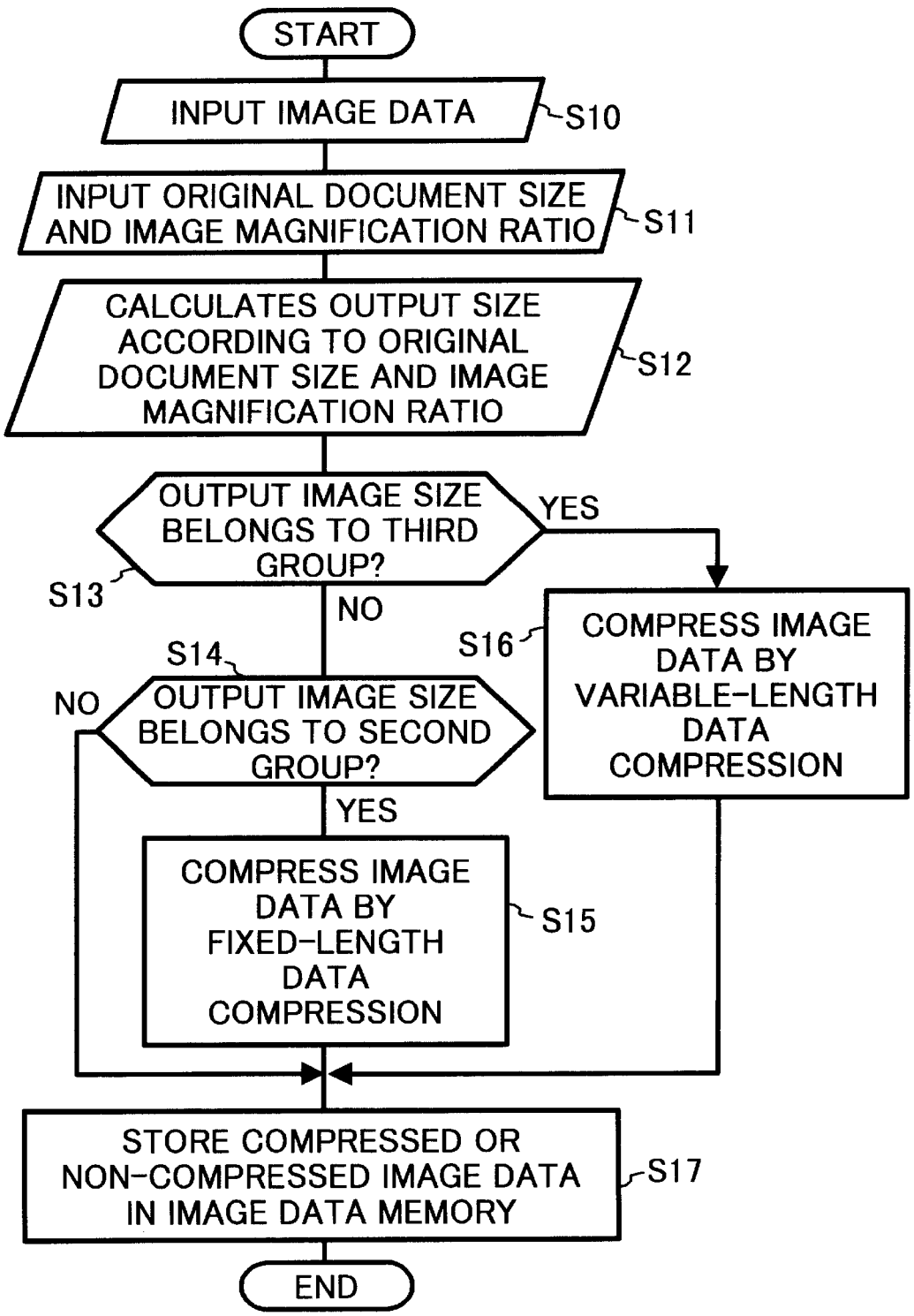

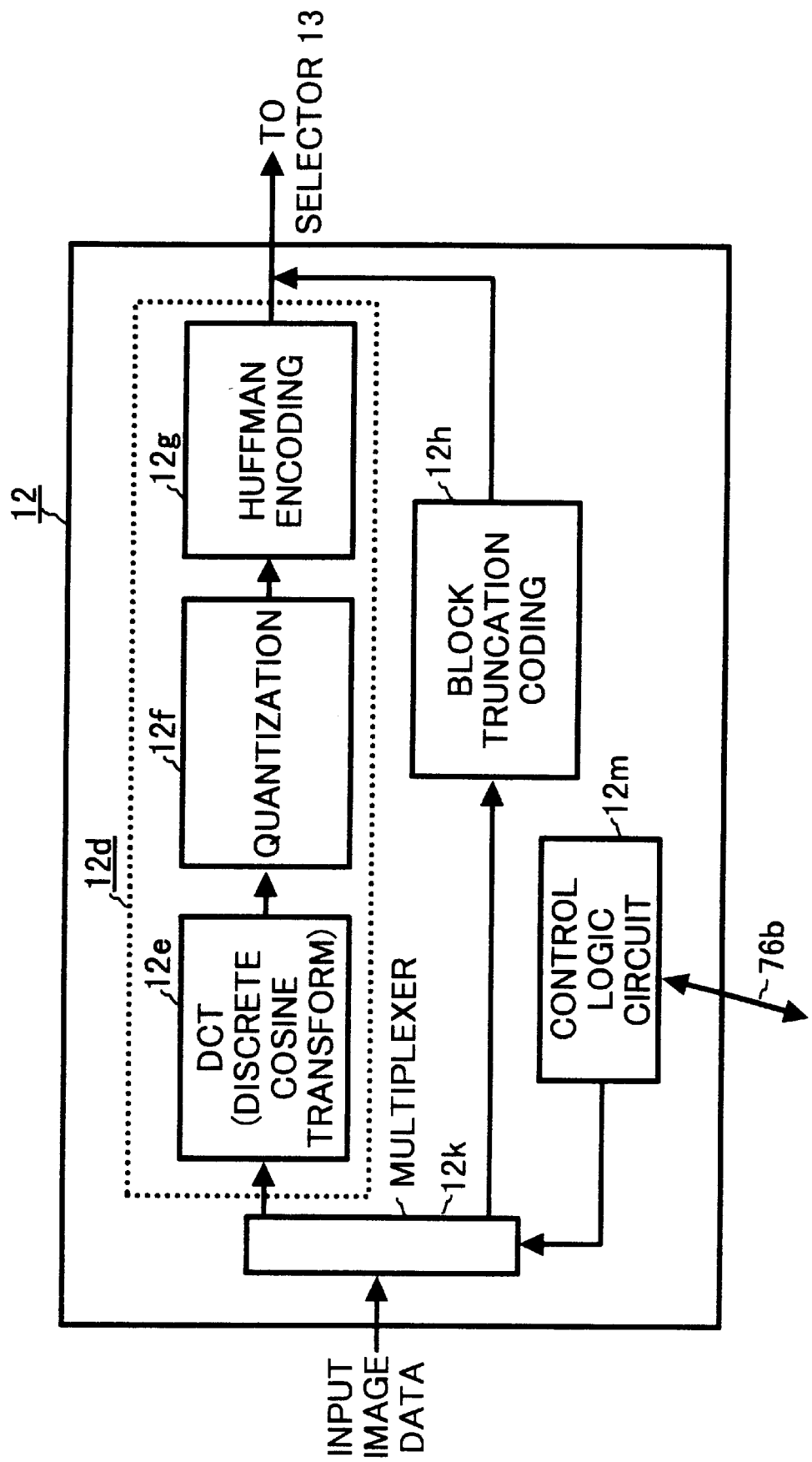

FIG. 12

| DATA COMPRESSION METHOD | OUTPUT IMAGE SIZE | | |
|---|---|---|---|
| | FIRST GROUP OF OUTPUT IMAGE SIZE | SECOND GROUP OF OUTPUT IMAGE SIZE | THIRD GROUP OF OUTPUT IMAGE SIZE |
| IMAGE DATA MEMORY | (NON-COMPRESSION) | FIXED-LENGTH DATA COMPRESSION (BTC METHOD) | VARIABLE-LENGTH DATA COMPRESSION (JPEG METHOD) |
| SEGMENTATION DATA MEMORY | (NON-COMPRESSION) | | REVERSIBLE VARIABLE-LENGTH DATA COMPRESSION (HUFFMAN ENCODING) |
| EDITING DATA MEMORY | (NON-COMPRESSION) | | REVERSIBLE VARIABLE-LENGTH DATA COMPRESSION (HUFFMAN ENCODING) |

FIG. 16

| DATA COMPRESSION METHOD | INPUT IMAGE SIZE | | |
|---|---|---|---|
| | FIRST GROUP OF INPUT IMAGE SIZE | SECOND GROUP OF INPUT IMAGE SIZE | THIRD GROUP OF INPUT IMAGE SIZE |
| IMAGE DATA MEMORY | (NON-COMPRESSION) | FIXED-LENGTH DATA COMPRESSION (BTC METHOD) | VARIABLE-LENGTH DATA COMPRESSION (JPEG METHOD) |
| SEGMENTATION DATA MEMORY | (NON-COMPRESSION) | (NON-COMPRESSION) | REVERSIBLE VARIABLE-LENGTH DATA COMPRESSION (HUFFMAN ENCODING) |
| EDITING DATA MEMORY | (NON-COMPRESSION) | (NON-COMPRESSION) | REVERSIBLE VARIABLE-LENGTH DATA COMPRESSION (HUFFMAN ENCODING) |

IMAGE PROCESSING METHOD AND APPARATUS TO SELECT A DATA COMPRESSION METHOD ACCORDING TO A SIZE OF AN OUTPUT IMAGE

BACKGROUND OF THE INVENTION

1. Filed of the Invention

The present invention relates to an image processing method and apparatus having a data compression function that applies to an image forming apparatus such as, for example, a digital photocopier and a printing system, and more particularly relates to an image processing method and apparatus that select a data compression method according to a size of an output image of the inputted image data.

2. Discussion of the Background

In general, image processing apparatuses that apply to image forming apparatuses such as a digital photocopier have an image data memory for storing inputted image data to rotate the image data for changing the direction of an image of the image data, for example, from a landscape orientation into a portrait orientation and vice versa. The image processing apparatuses input original image data inputted from, for example, an external inputting device such as an image scanning device, stores the data into the image data memory, rotates the image data, and then outputs the rotated image data to an external outputting device such as a printing device. In order to decrease the size or the capacity of the image data memory, the image processing apparatus generally compresses the image data before storing the data into the image data memory.

For a high-fidelity image reproduction, an image processing apparatus of a digital photocopier generally separates image data input from an image scanning device into three categories, a text area, a screened halftone image area and a continuous tone image area, so as to process each of the separated image areas in appropriate manners, respectively. For example, the image processing apparatus provides plural spatial filters and gradation converters, and applies adequate ones of the filters and gradation converters for each of the separated image areas. The above separating operation generates data defining a category for each of the picture elements structuring the input image, and hereinafter, such data is referred to as segmentation data. The segmentation data is temporarily stored in a memory, and hereinafter, the memory is referred to as a segmentation data memory. When the image data in the image data memory is rotated for changing the direction of the image, for example, from a landscape orientation to a portrait orientation, the segmentation data in the segmentation data memory is also rotated for enabling a swift access to the segmentation data. For decreasing the capacity of the segmentation data memory, the segmentation data is also generally compressed before being stored in the memory.

In a digital color photocopier, an image editing, such as a color change inside a specified region of an original document, is generally practiced. Data for editing an image, such as editing instructions for each picture element of the input image data, is temporarily stored in a memory so as to be used during the image editing operation. The data for editing the image and the memory for storing the data are hereinafter referred as editing data and an editing data memory. When the image data in the image data memory is rotated, the editing data in the editing data memory is also rotated for enabling swift access to the editing data. For decreasing the capacity of the editing data memory, the editing data is generally compressed before being stored in the memory.

A digital color photocopier is desired to provide an image processing apparatus having a function of recognizing an article that is forbidden by law to be reproduced, such as, bills, securities and so forth, and inhibiting an ordinary reproduction thereof. For recognizing such an article, the image processing apparatus first extracts features of an input image and temporarily stores the extracted feature data in a memory. Then, the image processing apparatus analyzes the extracted feature data and judges whether the article is legal to be reproduced. The extracted feature data is generally compressed before being stored in the memory for efficiency of space usage.

Image data compression methods are classified broadly into two categories according to a compressed data length-fixed-length data compression methods and variable-length data compression methods. In general, a variable-length data compression method yields higher compressibility than the fixed-length data compression method. The Block Truncation Coding ("BTC") method is a known exemplary fixed-length data compression method. A fixed-length data compression method yields swift memory access because the location of a picture element and an address in which the data of the picture element is stored are kept in a linear relationship. Therefore, when image data is compressed by the fixed-length data compression method, an image rotating operation is swiftly accomplished. However, compressibility or a compression ratio of the fixed-length data compression method, which is measured by a ratio of the compressed data size to the original data size, is relatively small. The compression ratio of the BTC method is, for example, 0.6.

The Joint Photographic Expert Group ("JPEG") method is a known exemplary variable-length data compression method. A variable-length data compression method yields a high compression ratio, but compressed data length is not a constant value. Therefore, to access compressed data in a memory, the address where the data is stored must be calculated. Accordingly, if image data is compressed by the variable-length data compression method, an operating time for the rotation of the compressed data generally becomes too long for practical use in a digital photocopier. The compression ratio of the variable-length data compression method is varied according to contents of an image data, however it can be limited to a certain value. For example, the compression ratio of the JPEG method can be limited to 0.4.

Japanese Patent No. 2618988 describes a system having a fixed-length data compression device. In the system, original image data is compressed into fixed-length data by the fixed-length data compressing device, then the compressed data is stored in an image data memory device. Thus, the capacity of the image data memory device is relatively large.

Image data compression methods are also classified into two categories according to reversibility between original data and compressed data-reversible compression methods and irreversible compression methods. When data that has been compressed by a reversible compression method is expanded, the expanded data exactly accord with the original data. When data that has been compressed by an irreversible compression method is expanded, the expanded data is slightly different from the original data. Both the BTC method and the JPEG method are irreversible compression methods. The Huffman encoding method is a known exemplary reversible data compression method which is also classified as a variable-length data compression. Generally, an irreversible compression method has higher compressibility than a reversible compression method. The compression ratio of the Huffman encoding method is varied according to contents of image data, however it can be limited to a fixed value such as, for example, 0.5.

Image data may be compressed by a reversible compression method or an irreversible compression method depending upon a desired image quality of an image reproduction. When image data is required to be rotated, hitherto one of the fixed-length data compression methods is generally used for a swift rotating operation of the image data. Further, generally in order to make an image processing apparatus in a simple configuration, a single method, i.e., a fixed-length data compression method is used for compression, regardless of the sizes of an input image. Consequently, the capacity of the image memory is required to be large enough to store an image of the largest size. Further, in order to construct an image processing apparatus in a simple configuration, even when the data size of an original document is small enough to be stored in the image memory without compression, the original document data is generally automatically compressed, and thereby an operating time for the data compression is wasted.

On the other hand, it is desirable to compress segmentation data and editing data by one of the reversible compression methods in order to reproduce an image while maintaining high fidelity of an image reproduction and accuracy of editing an image. In addition, when image data is rotated, segmentation data and editing data for the image data are also required to be rotated. Accordingly, one of the fixed-length data compression methods is generally used for segmentation data and editing data for accomplishing a swift rotating operation of the segmentation data and editing data. Consequently, hitherto a reversible and fixed-length data compression method is generally used for compressing segmentation data and editing data.

When segmentation data and editing data are compressed by a reversible fixed-length data compression method, access to the segmentation data or the editing data for either writing data into the memory or reading data out from the memory during an image rotating operation, is swiftly accomplished without complex address calculation.

However, because the reversible fixed-length data compression method has a low compression ratio, the capacities of a segmentation data memory and an editing data memory, respectively, are required to be relatively large. Further, in order to construct an image processing apparatus in a simple configuration, even when segmentation data or editing data is small enough to be stored in the segmentation memory or the editing data memory without data compression, the data is generally automatically compressed and then stored in the memory. Thus, segmentation data and editing data are always compressed regardless of the sizes of the data. Accordingly, when segmentation data and editing data are small enough to be stored in respective memories without data compression, an operating time for the data compression is wasted.

SUMMARY OF THE INVENTION

Accordingly, one object of the present invention is to provide a novel image processing method and apparatus which have a function of data compression and which are capable of decreasing a capacity of an image data memory and decreasing an image processing time.

Another object of the present invention is to provide a novel image processing method and apparatus which have a function of data compression and which are capable of decreasing a capacity of an editing data memory and decreasing an image processing time.

Another object of the present invention is to provide a novel image processing method and apparatus which have a function of data compression and which are capable of decreasing a capacity of an image segmentation data memory and decreasing an image processing time.

According to the preferred embodiment of the present invention, an image processing apparatus for inputting image data from an external image inputting device and outputting the inputted image data to an external image outputting device after processing the data, includes a data compression device for compressing the inputted image data by a variable-length data compression method. An image data storing device stores the inputted image data therein. A control device controls the apparatus, such that, when a size of an output image of the inputted image data is larger than a predetermined size, the data compression device compresses the inputted image data by the variable-length data compression method and the image data storing device stores the compressed image data therein, and, when the output image of the inputted image data is equal to or smaller than the predetermined size, the image data storing device stores the inputted image data therein without data compression.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is a table illustrating a relationship between output image sizes and image data compression methods employed in the image processing apparatus of FIG. 1;

FIG. 4 is a flowchart illustrating operational steps for practicing an image data compression method in the image processing apparatus of FIG. 1;

FIG. 5 is a schematic block diagram illustrating a structure of the image data compressor 12 of FIG. 1;

FIG. 12 is a table illustrating a relationship between output image sizes and image data compression methods such as the image segmentation data compression method and the image editing data compression method employed in the image processing apparatus of FIG. 11;

FIG. 16 is a table illustrating a relationship between input image sizes and image data compression methods such as the image segmentation data compression method and the image editing data compression method employed in the image processing apparatus of FIG. 11 and the image processing apparatus of FIG. 15.

DESCRIPTION OF THE PREFERRED EMBODIMENTS

Figure 1:
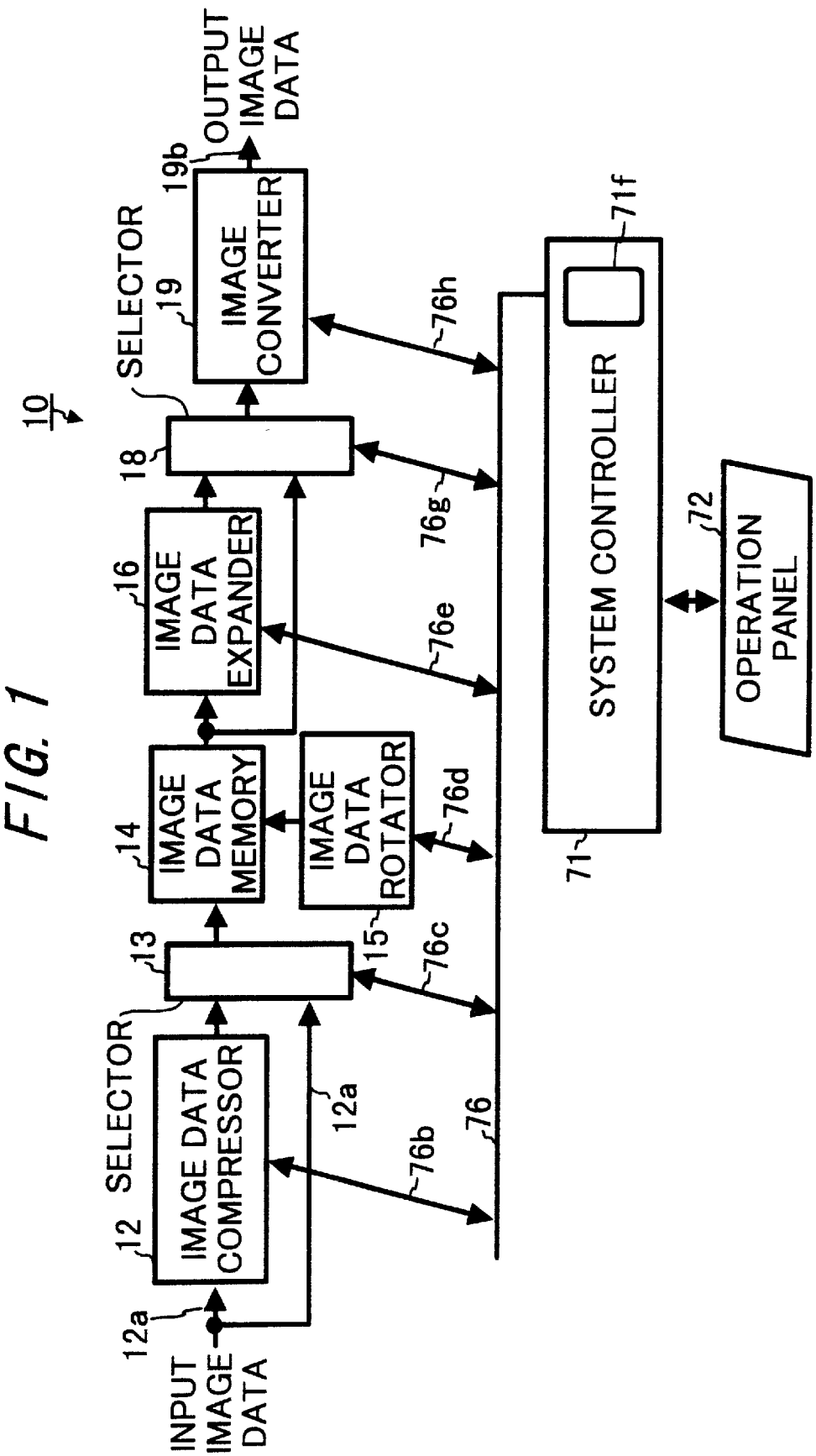
FIG. 1 is a schematic block diagram illustrating a structure of an image processing apparatus according to a first embodiment of the present invention.

Referring now to the drawings, wherein like reference numerals designate identical or corresponding parts throughout the several views, and more particularly to FIG. 1 thereof, there is shown a schematic block diagram illustrating a structure of an image processing apparatus 10 according to a first embodiment of the present invention. Referring to FIG. 1, the image processing apparatus 10 includes an image data compressor 12, selectors 13 and 18, an image data memory 14, an image data rotator 15, an image data expander 16, an image converter 19, a system controller 71, a control bus 76 and an operation panel 72. Image data is input from an external image-input device (not shown), such as, for example, an image scanner, a video camera, etc., which connects to an input terminal 12a of the image data compressor 12. Processed image data is output from an output terminal 19b of the image converter 19 to an external image-output device (not shown), such as, for example, a laser printer, a video monitor, etc., connected to the output terminal 19b.

The control bus 76 connects the system controller 71 and the other devices and transmits signals between the system controller 71 and the other devices via branched buses 76b, 76c, 76d, 76e, 76g and 76h. The system controller 71 controls the other devices by sending various commands via the control bus 76. When the external image-input device and the external image-output device are connected with the control bus 76, the system controller 71 can also control the external image-input device and the external image-output device via the control bus 76. The system controller 71 includes a central processing unit (CPU) (not shown), a read only memory (ROM) 71f and a random access memory (RAM) (not shown). The ROM 71f contains program codes and can be replaced by a rewritable medium, such as a hard disk or a flash memory, so that the program codes can be easily upgraded. The operation panel 72 includes keys and a display, and inputs operating commands via the keys and outputs status messages of the image processing apparatus 10 on the display.

Figure 2A:
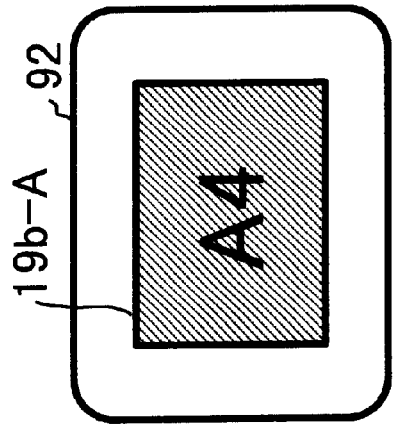
FIG. 2A illustrates an A4 size image in landscape orientation on a monitor screen.
Figure 2B:
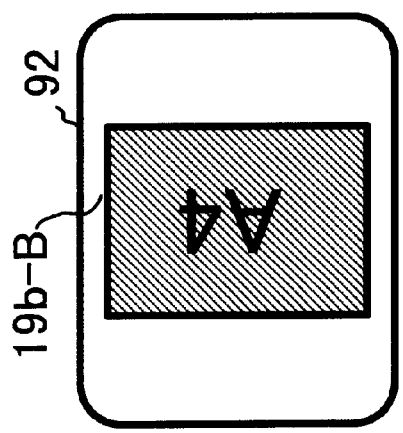
FIG. 2B illustrates an A4 size image in portrait orientation on the monitor screen.
Figure 2C:
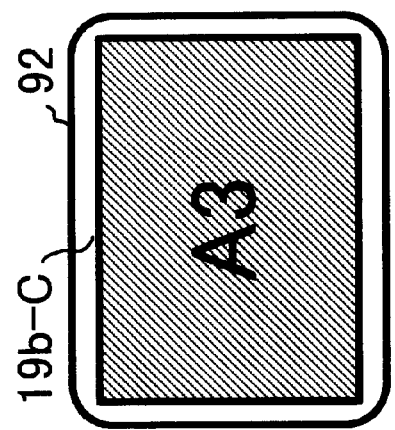
FIG. 2C illustrates an A3 size image in landscape orientation on the monitor screen.

The image data rotator 15 is configured such that an image larger than the A4 size, such as an A3 size image, cannot be rotated, i.e., an image of A4 or smaller size can be rotated. This is because display devices, as image-inputting devices, generally can display an image larger than A4 size, such as an A3 image, only in landscape orientation. FIG. 2A illustrates an A4 size image 19b-A in landscape orientation on a 21-inch monitor screen 92. When the A4 size image data in landscape orientation is rotated 90 degrees by the image data rotator 15 and is output to the 21-inch monitor screen 92, the rotated A4 size image is in portrait orientation on the monitor screen as indicated by a reference numeral 19b-B in FIG. 2B. FIG. 2C illustrates an A3 size image 19b-C, which belongs to the third group in FIG. 3, in landscape orientation on the same 21-inch monitor screen 92. When an image size is relatively large such as A3, and if the image is rotated, the rotated image will not fit in the 21-inch monitor screen 92. Further, some laser printers, as image-output devices, can print an A3 size image only in landscape orientation.

Referring back to FIG. 1, the image data compressor 12 provides a data compression function with a plurality of methods: a fixed-length data compression having a compression ratio 0.6, and a variable-length data compression having a compression ratio 0.4 at the maximum. When image data is input to the input terminal 12a, the system controller 71 sends a command to the image data compressor 12 for specifying that it use one of the plural methods. Then, the image data compressor 12 compresses the input data by the specified method and outputs the compressed data to the selector 13.

FIG. 3 is a table illustrating a relationship between output image sizes and image data compression methods according to which the image processing apparatus 10 operates. As illustrated in FIG. 3, different image data compression methods are applied according to the output image size. In this example, the first group of output image sizes includes small sizes such as, for example, the A6 size and sizes smaller than A6 size, and data compression is not applied to image data in this group in order to save data compression and expansion time. The second group of output image sizes includes medium sizes larger than A6 and smaller than A3, such as, for example, the A5 size and the A4 size, and a fixed-length data compression method such as, for example, the BTC method is applied to the image data in this group for reducing the data size while maintaining image rotating operability. The third group of output image sizes includes large sizes larger than A4, such as, for example, the A3 size, and because image data in this group is not required to be rotated, a variable-length data compression method having a compression ratio higher than a fixed-length data compression method such as, for example, the JPEG method, is applied to image data in this group for further reducing the data size.

In this embodiment, the image data memory 14 is configured to have a capacity to store the largest one of three output image data in the above three groups, i.e., image data in the first, small size, group of FIG. 3, which is not compressed, image data in the second, medium size, group which is compressed by the fixed-length data compression method, and image data in the third, large size, group which is compressed by the variable-length data compression method. More specifically, color image data of an A3 size document, for example, with 400 dots per inch (dpi) resolution and 8-bit gradation, requires a capacity of about 96 megabytes. Likewise, image data of an A4 size document requires a capacity of about 48 megabytes and image data of an A6 size document requires a capacity of about 12 megabytes. In this embodiment, input image data of an A3 size document, which belongs to the third group of image sizes, is compressed by the variable-length data compression method with the maximum compression ratio of 0.4, and thereby the compressed data requires at most 38.4 megabytes. Input data of an A4 size document, which belongs to the second group of image sizes and which is half the A3 size, is compressed by the fixed-length data compression with the compression ratio 0.6, and thereby the compressed data requires 28.8 megabytes. Input data of an A6 size document, which belongs to the third group of image sizes and is ⅛ the size of the A3 size, is not compressed, and thereby the data size is 12 megabytes. Accordingly, the image data memory 14 is configured to have a capacity of 38.4 megabytes so that the largest image data in the three output image size groups, i.e., the image data in the third, large size group of image sizes, which is compressed by the variable-length data compression method, can be stored.

FIG. 4 is a flowchart illustrating operational steps for selecting one of the image data compression methods in the image processing apparatus 10. Referring to FIG. 4, after starting, in step S10, the image data compressor 12 inputs image data received from an external inputting device. In step S11, the system controller 71 inputs information of an original document size and an image magnification ratio received from the operation panel 72. In step S12, the system controller 71 calculates an output image size. The output image size is determined as a product of the original document size and the image magnification ratio.

In step S13, the system controller 71 judges whether the output image size belongs to the third group in the table of FIG. 3. When the output image size belongs to the third group, the process proceeds to step S16. In the step S16, the system controller 71 sends a command to the image data compressor 12 to compress the input image data by the variable-length data compression method, and the compressor 12 compresses the input image data by the variable-length data compression method.

In the step S13, when the output image size does not belong to the third group, the process proceeds to step S14. In the Step S14, the system controller 71 judges whether the output image size belongs to the second group in the table of FIG. 3. When the output image size belongs to the second group, the process proceeds to step S15, and when the output image size does not belong to the second group, the process proceeds to step S17. In the step S15, the system controller 71 sends a command to the image data compressor 12 to compress the input image data by the fixed-length data compression method, and the image data compressor 12 compresses the input image data by the fixed-length data compression method. In the step S17, the image data memory 14 stores the compressed or non-compressed image data therein.

Referring back to FIG. 1, the system controller 71 controls the selector 13 to output one of two input data, data inputted from the image data compressor 12 and data inputted from the external inputting device. When the output image data belongs to the second or third group, the data inputted for the image data compressor 12 is selected to be outputted for the next stage. The image data memory 14 stores the image data therein, which is output from the selector 13.

When the system controller 71 sends an image rotation command to the image data rotator 15, the image data rotator 15 rotates the image data through operations of writing the image data in the image data memory 14 and reading out the image data therefrom.

The image data expander 16 expands the compressed image data input from the image data memory 14 by an inverse conversion method of the method by which the image data has been compressed and outputs the expanded data to the selector 18.

When the image data has not been compressed, the system controller 71 controls the selector 18 to output the data input from the image data memory 14, and when the image data has been compressed, the system controller 71 controls the selector 18 to output the data input from the image data expander 16. The image converter 19 performs an image conversion, such as, for example, a color correction, a color change, a special filtering, etc., and outputs the converted image data to an image output device connected to the terminal 19b.

As described above, in the image processing apparatus 10, the image data memory 14 is configured to have a capacity of 38.4 megabytes such that the largest image data in the third large size group of output image size can be stored therein. If the image data in the third group of output image sizes is compressed by the fixed-length data compression method like a background art, the image data memory 14 is required to have a capacity of 57.6 megabytes. Thus, the capacity of the image data memory 14 is decreased. Further, because image data in the first group of output image sizes is not compressed, the image processing time for small size images is decreased. In addition, because image data in the first group of output image sizes is not compressed and image data in the second group of output image sizes is compressed by the fixed-length data compression, the image processing apparatus 10 swiftly accomplishes the image rotating operation of the image data in the first and second groups of the output image sizes.

FIG. 5 is a schematic block diagram illustrating an exemplary structure of the image data compressor 12 of FIG. 1. Referring to FIG. 5, the image data compressor 12 includes a multiplexer 12k, a JPEG compressor 12d constructed with a discrete cosine transform ("DCT") device 12e, a quantization device 12f and a Huffman encoding device 12g, a block truncation coding ("BTC") device 12h and a control logic circuit 12m. When image data is input to the image data compressor 12, the system controller 71 sends a command to the control logic circuit 12m of the image data compressor 12 to use one of the JPEG compressor 12d and the BTC device 12h. When the system controller 71 determines that the outputted image size is one in the second group of image sizes in FIG. 3, the system controller 71 sends a command to use the BTC device 12h to the control logic circuit 12m, and the control logic circuit 12m controls the multiplexer 12k to pass the input image data to the BTC device 12h. The BTC device 12h compresses the image data by the BTC method as the fixed-length data compression. When the output image size is one in the third group of image sizes in FIG. 3, the control logic circuit 12m controls the multiplexer 12k to pass the input image data to the JPEG compressor 12d, and the JPEG compressor 12d compresses the image data by the JPEG method as the variable-length data compression.

Figure 6:
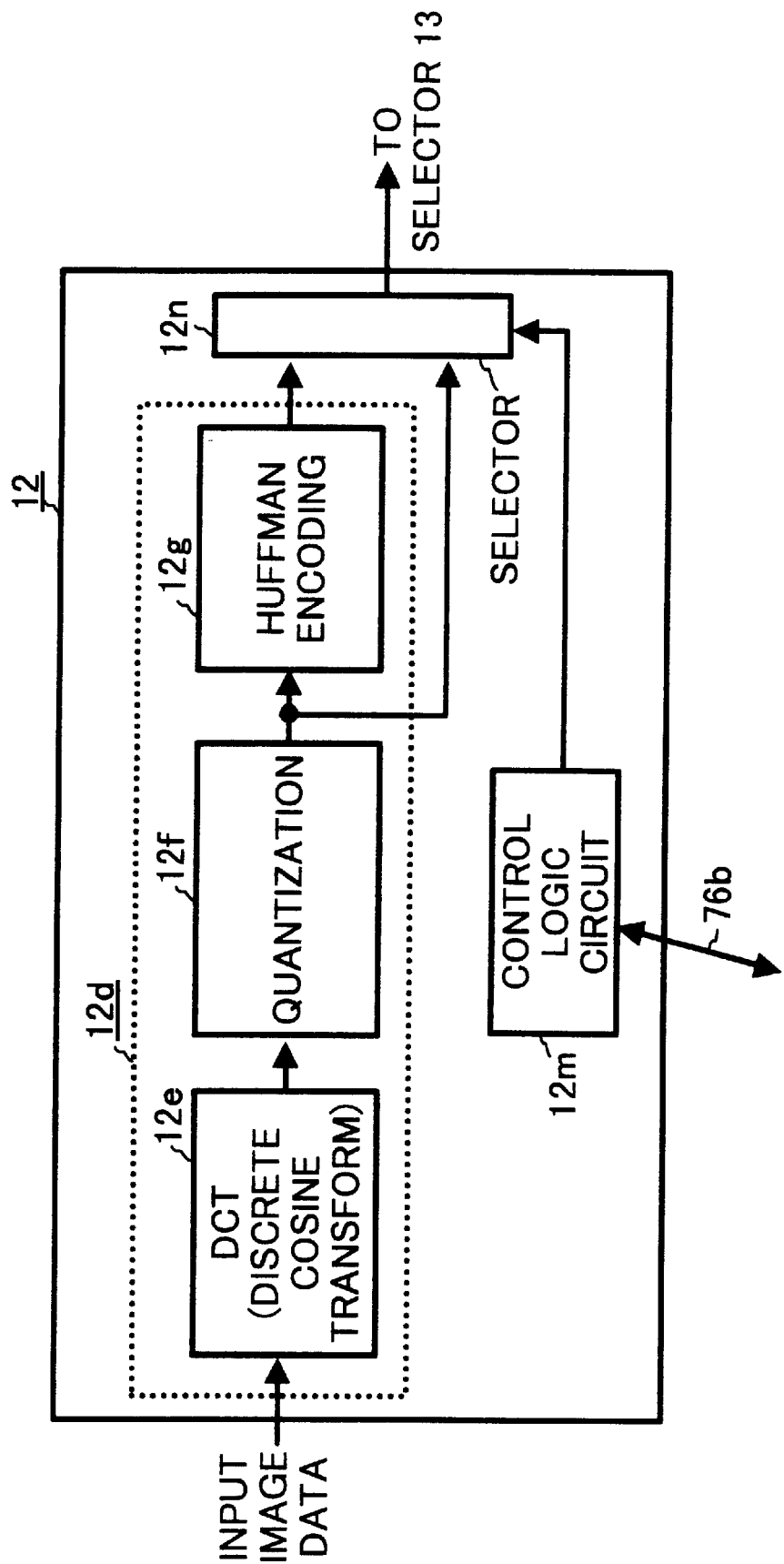
FIG. 6 is a schematic block diagram illustrating another structure of the image data compressor 12 of FIG. 1.

FIG. 6 is a schematic block diagram illustrating another example of structure of the image data compressor 12 of FIG. 1. Referring to FIG. 6, the image data compressor 12 includes a selector 12n, a JPEG compressor 12d constructed with a DCT device 12e, a quantization device 12f and a Huffman encoding device 12g, and a control logic circuit 12m. When image data is input to the image data compressor 12, the data undergoes discrete cosine transformation by the DCT device 12e, quantization by the quantization device 12f and Huffman encoding by the Huffman encoding device 12g.

The control logic circuit 12m controls the selector 12n to output either one of the output of the quantization device 12f or the output of the Huffman encoding device 12g. When output image size is one in the second group of image sizes in FIG. 3, the control logic circuit 12m controls the selector 12n to output image data from the output of the quantization device 12f. Therefore, the output image data undergoes discrete cosine transformation and quantization, and thereby the output image data becomes fixed-length compressed data. When the output image size is one in the third group of image sizes in FIG. 3, the control logic circuit 12m controls the selector 12n to output image data output from the Huffman encoding device 12g of the JPEG compressor 12d, and thereby the output image data becomes variable-length compressed data.

Because the JPEG compressor 12d in the image data compressor 12 of FIG. 6 functions for both fixed-length and variable-length data compression, the image data compressor 12 does not require an independent fixed-length data compression device, thereby reducing the production costs.

Figure 7:
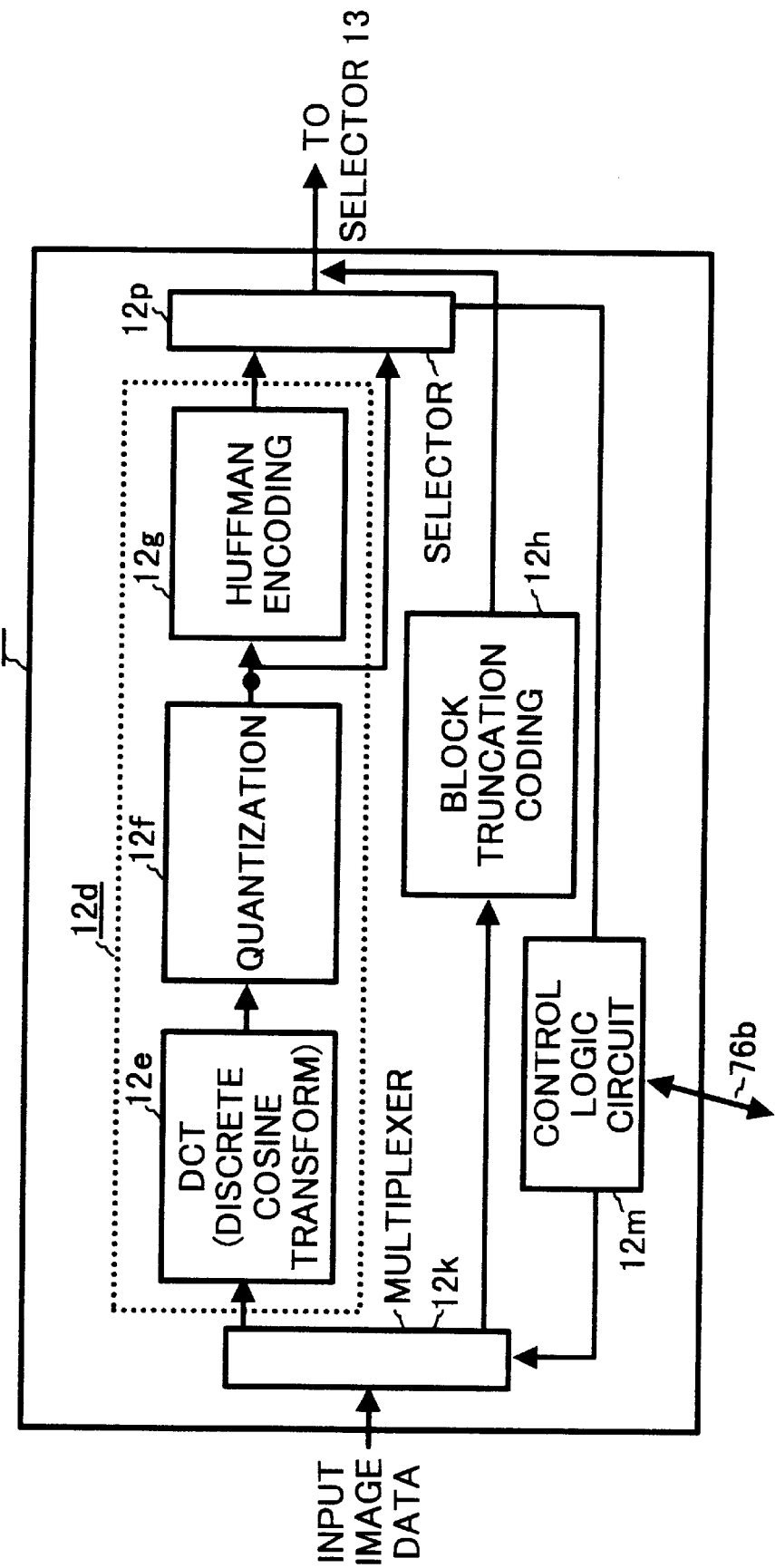
FIG. 7 is a schematic block diagram illustrating still another structure of the image data compressor 12 of FIG. 1.

FIG. 7 is a schematic block diagram illustrating still another example of structure of the image data compressor 12 of FIG. 1. Referring to FIG. 7, the image data compressor 12 includes a multiplexer 12k, a selector 12p, a JPEG compressor 12d constructed with a DCT device 12e, a quantization device 12f and a Huffman encoding device 12g, a BTC device 12h and a control logic circuit 12m.

When output image size is one in the second group of image sizes in FIG. 3 and is equal to or smaller than the A5 size, such as, for example, A5 size, the control logic circuit 12m controls the multiplexer 12k to pass the input data to the BTC device 12h and the BTC device 12h compresses the image data by the BTC method as a first fixed-length data compression method. When output image size is one in the second group of image sizes in FIG. 3 and is larger than the A5 size, such as, for example, A4 size, the control logic circuit 12m controls the multiplexer 12k to pass the input image data to the JPEG compressor 12d and the control logic circuit 12m controls the selector 12p to output compressed image data from the output of the quantization device 12f. Therefore, the input image data undergoes discrete cosine transformation and quantization by the DCT device 12e and the quantization device 12f, and thereby the image data is compressed by a second fixed-length data compression method.

When an output image size which is one in the third group of image sizes in FIG. 3 is input, the control logic circuit 12m controls the multiplexer 12k to pass the input image data to the JPEG compressor 12d and the control logic circuit 12m controls the selector 12p to output the compressed image data output from the Huffman encoding device 12g. Thereby, the output image data is output as variable-length data.

Figure 8:
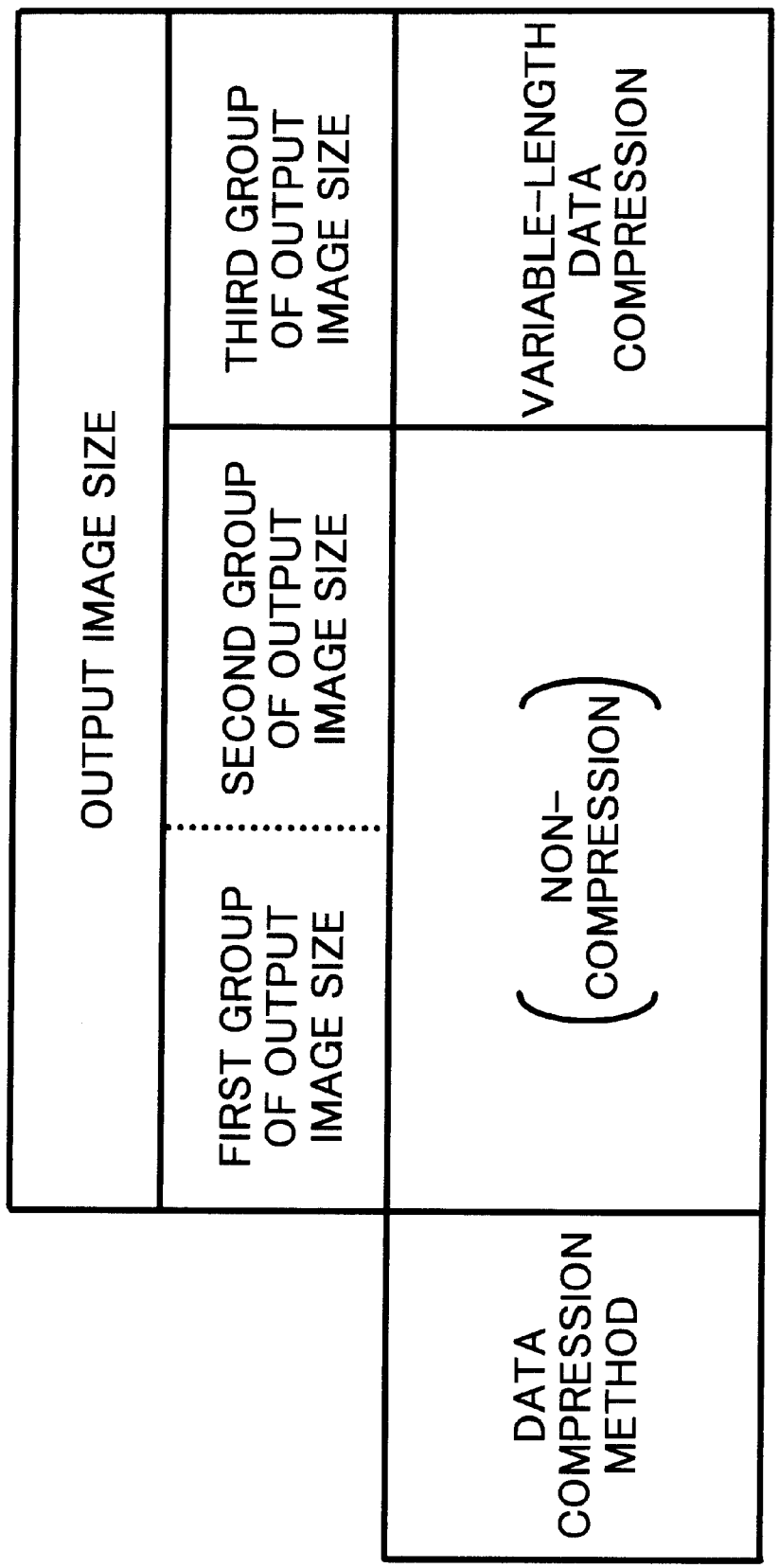
FIG. 8 is a table illustrating a relationship between output image sizes and image data compression methods as a second example employed in the image processing apparatus of FIG. 1.
Figure 9:
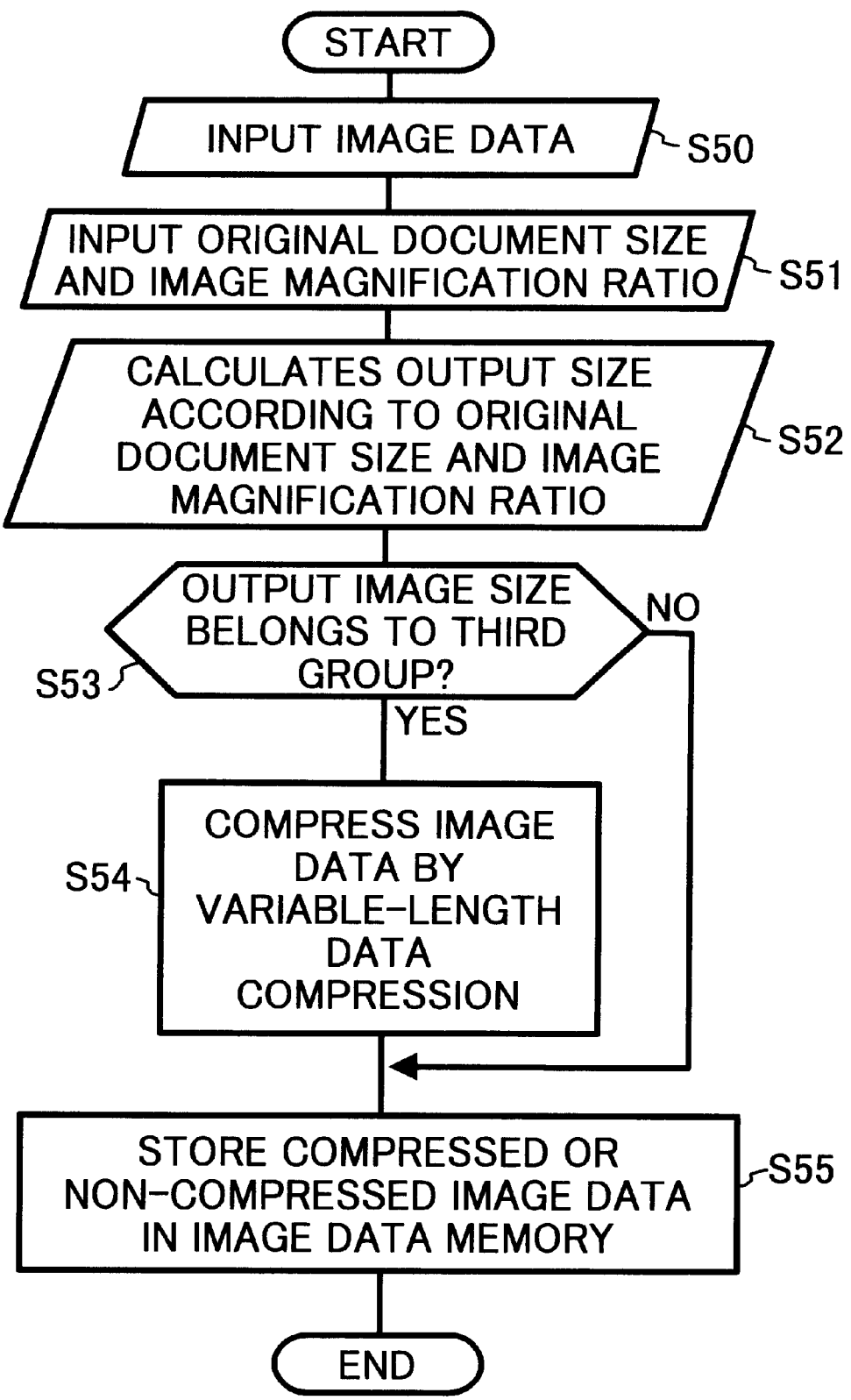
FIG. 9 is a flowchart illustrating operational steps for practicing an image data compression as a second example in the image processing apparatus of FIG. 1.

FIG. 8 is a table illustrating another relationship between output image sizes and image data compression methods applied in the image processing apparatus 10 of FIG. 1, and FIG. 9 is a flowchart illustrating operational steps for practicing image data compression in the image processing apparatus 10 of FIG. 1. Referring to FIG. 9, after starting, in step S50, the image data compressor 12 inputs image data received from an external inputting device. In step S51, the system controller 71 inputs information of an original document size and an image magnification ratio received from the operation panel 72. In step S52, the system controller 71 calculates an output image size.

In step S53, the system controller 71 judges whether the output image size belongs to the third group in the table of FIG. 8. When the output image size belongs to the third group, the process proceeds to step S54. In the step S54, the system controller 71 sends a command to the image data compressor 12 to compress the input image data by a variable-length data compression method, compressor 12 compresses the input image data by a variable-length data compression method such as the JPEG method, and the process proceeds to step S55. When step S53 determines that the output image size does not belong to the third group, the process proceeds to step S55. In step S55, the compressed or non-compressed image data is stored in the image data memory 14.

Figure 10:
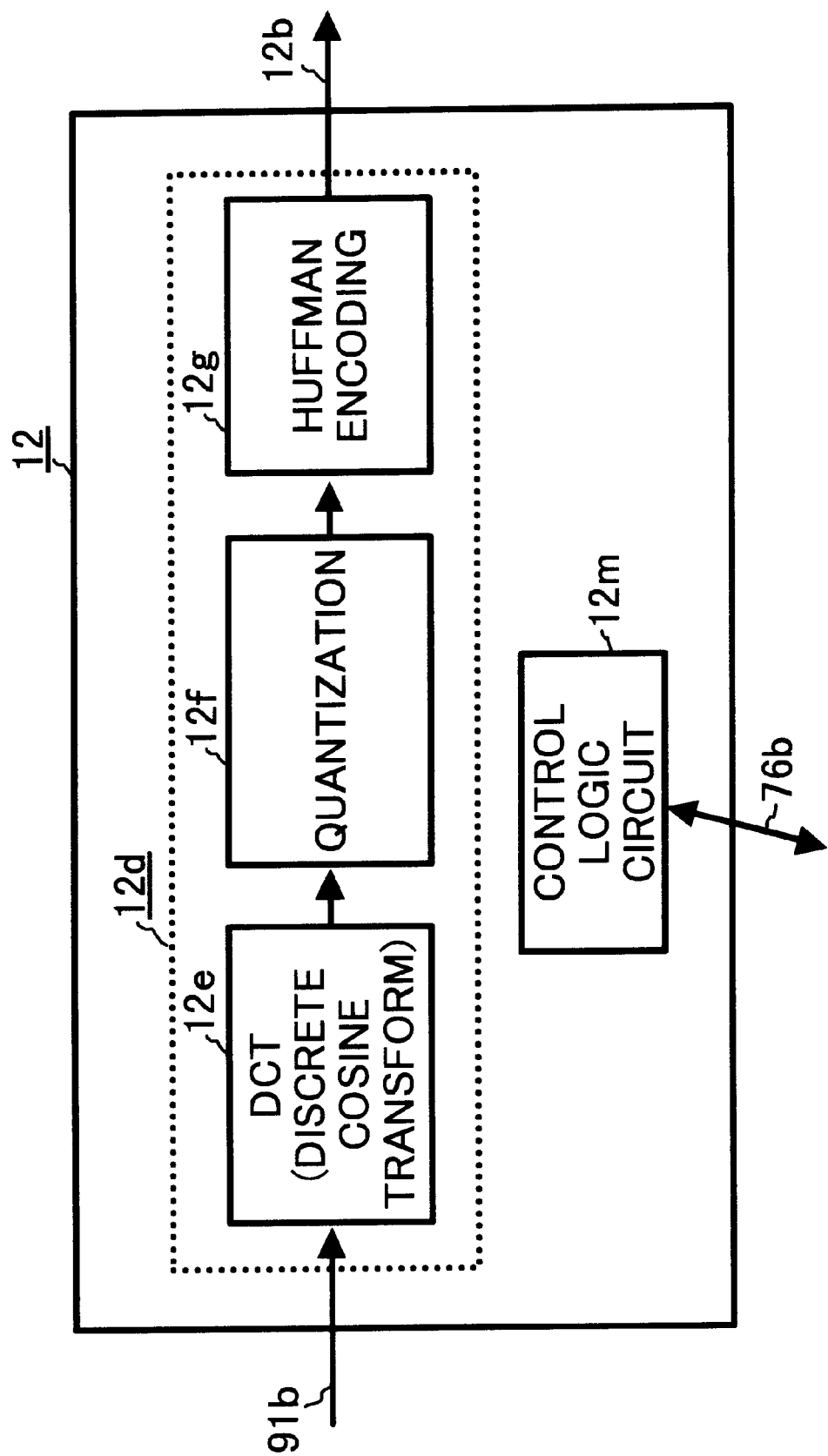
FIG. 10 is a schematic block diagram illustrating a structure of the image data compressor 12 of FIG. 1.

FIG. 10 is a schematic block diagram illustrating an exemplary structure of the image data compressor 12 of FIG. 1 for practicing an image data compression of FIG. 9. In FIG. 10, the image data compressor 12 includes a JPEG compressor 12d constructed with a DCT device 12e, a quantization device 12f and a Huffman encoding device 12g, and a control logic circuit 12m. When an output image size is one in the third group of output image sizes in FIG. 8, the JPEG compressor 12d compresses inputted image data by variable-length data compression. When the output image size is one in the second group or the third group of image sizes in FIG. 8, the inputted image data is not compressed. When the image data compression is practiced on the method of FIG. 9, although image data in the third group of image sizes in FIG. 8 is compressed to 28.8 megabytes, image data in the second group of image sizes in FIG. 8 is not compressed and thereby becomes 48 megabytes. Accordingly, the capacity of the image data memory 14 is required to be at least 48 megabytes for storing image data in the second group of image sizes in FIG. 8 without data compression. The capacity of the image data memory 14, i.e., 48 megabytes, is larger than when the image data compression is practiced on the method of FIG. 4, i.e., 38.4 megabytes, however the structures of the image data compressor 12 and the image data expander 16 become simpler because only one method of data compression is used.

Figure 11:
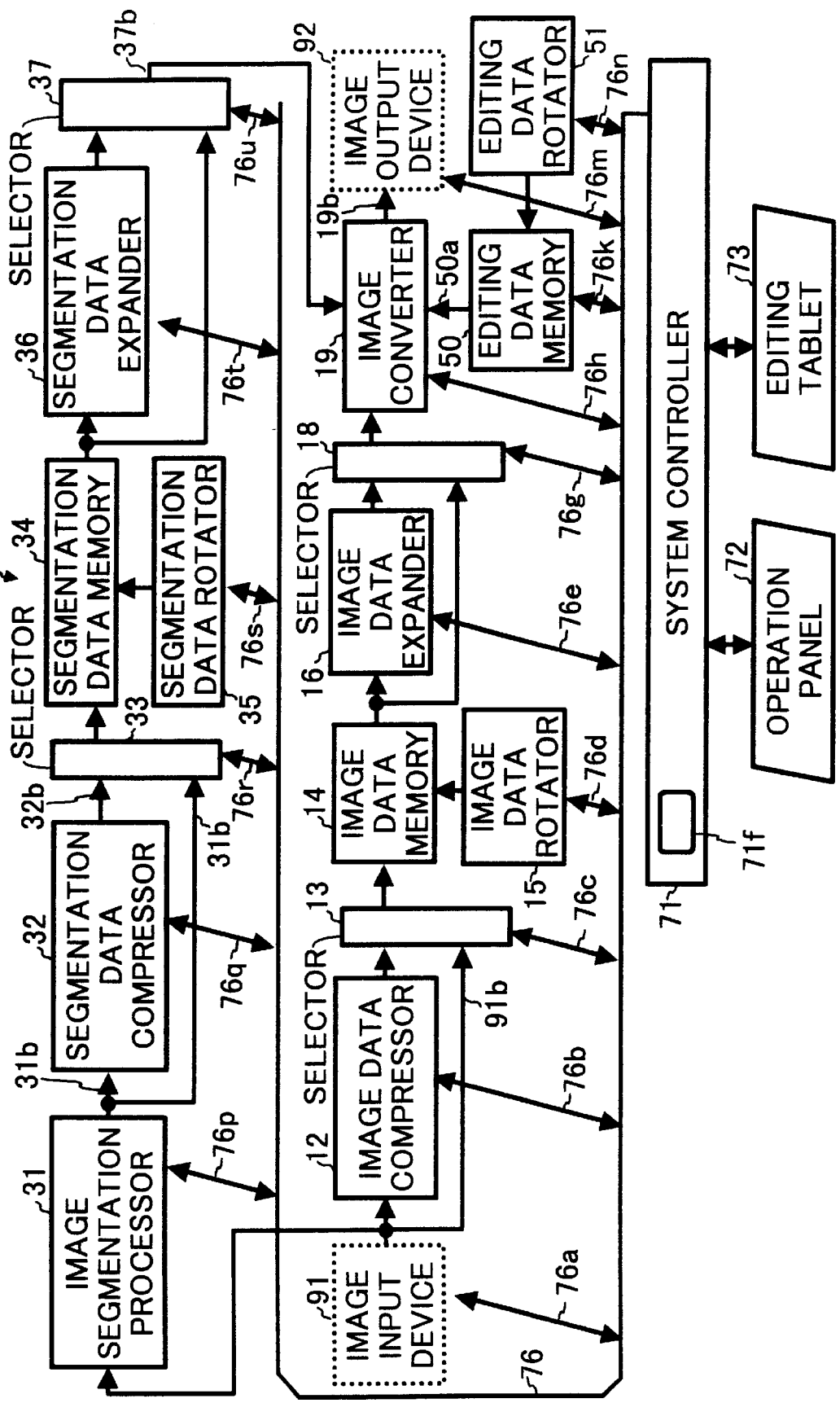
FIG. 11 is a schematic block diagram illustrating a structure of an image processing apparatus according to a second embodiment of the present invention.

FIG. 11 is a schematic block diagram illustrating a structure of an image processing apparatus 11 according to a second embodiment of the present invention. In FIG. 11, the elements that are substantially the same as those in FIG. 1 are denoted by the same reference numerals. Referring to FIG. 11, the image processing apparatus 11 includes an image data compressor 12, selectors 13, 18, 33 and 37, an image data memory 14, an image data rotator 15, an image data expander 16, an image converter 19, an image segmentation processor 31, a segmentation data compressor 32, a segmentation data memory 34, a segmentation data rotator 35, a segmentation data expander 36, an editing data memory 50, an editing data rotator 51, a system controller 71, a control bus 76, an operation panel 72 and an editing tablet 73. The image data compressor 12, the selectors 13 and 18, the image data memory 14, the image data rotator 15, the image data expander 16 and the operation panel 72 operate substantially in the same manner as those denoted by the same reference numerals in FIG. 1, and therefore the description of those elements is omitted.

The image processing apparatus 11 connects to an external image-input device 91 such as, for example, an image scanner and an external image-output device 92 such as, for example, a laser printer. The control bus 76 connects the system controller 71 and the other devices including the image-input device 91 and the image-output device 92 via branched buses 76a, 76b, 76c, 76d, 76e, 76g, 76h, 76k, 76m, 76n, 76p, 76q, 76r, 76s, 76t and 76u, and transmits signals between the system controller 71 and the other devices. The system controller 71 controls the other devices including the external image-input device 91 and the external image-output device 92 by sending various commands via the control bus 76. The system controller 71 also compresses and expands editing data. The system controller 71 includes a CPU (not shown), a ROM 71f and a RAM (not shown). The ROM 71f contains program codes and expansion programs for editing data, and can be replaced by a rewritable medium such as a hard disk or a flash memory so that the program can be easily upgraded.

The editing tablet 73 includes a liquid crystal display ("LCD") panel (not shown) covered with a pressure sensitive transparent sheet. The editing tablet 73 inputs original image data, which is input from the external image-input device 91, via the control bus 76 and the system controller 71, and displays the input image on the LCD panel. The editing tablet 73 also inputs editing data, which is input from the LCD panel covered with the pressure sensitive sheet when the operator touches the sheet, such as, for example, a color change command. The editing data is compressed by the CPU of the system controller with a reversible variable-length data compression method when the image size to be output to the image output device 92 is larger than the A4 size, such as the A3 size, as described later. The compression ratio of the reversible variable-length data compression method is varied according to contents of data, however, in this embodiment, the compression ratio is set to 0.5 at most. The compressed editing data is expanded by the CPU of the system controller 71 before the editing data is utilized for the image editing. The data compression and expansion programs are installed in the ROM 71f of the system controller 71. The editing data memory 50 stores the editing data, which is compressed or not compressed.

When the image data is rotated, the editing data is also rotated, and the system controller 71 sends an editing data rotation command to the editing data rotator 51 to rotate the editing data. The editing data rotator 51 rotates the editing data through the operations of writing the editing data in the editing data memory 50 and reading out the data therefrom.

The image segmentation processor 31 categorizes or segments image data, which is input from the image input device 91, into text areas, screened halftone image areas and continuous tone image areas. An image segmentation method such as, for example, a method by Satoshi Ohuchi et al., which is described in "Segmentation Method for Documents Containing Text/Picture (Screened Halftone, Continuous Tone)", The Transactions of The Institute of Electronics, Information and Communication Engineers D-II, vol. J77-DII, No. 1, 1994, pp. 39–47, can be used.

The result data of the segmentation, i.e., the segmentation data, is output to the segmentation data compressor 32 and the selector 33. The segmentation data compressor 32 compresses the segmentation data according to a segmentation data compression command generated by the system controller 71 when the image size to be output to the image output device 92 is larger than the A4 size, such as the A3 size, as described later. When the segmentation data compressor 32 receives the segmentation data compression command, the segmentation data compressor 32 compresses the segmentation data by a reversible variable-length data compression method, and then outputs the compressed data to the selector 33. The compression ratio of the reversible variable-length data compression method is varied according to contents of data; however, in this embodiment, the compression ratio is set to a maximum of 0.5.

The system controller 71 controls the selector 33 to output one of two input data, input data from the output 32b of the segmentation data compressor 32 and input data from the output 31b of the image segmentation processor 31. The segmentation data memory 34 stores the segmentation data output from the selector 33.

When the image data is rotated, the segmentation data is also rotated, and the system controller 71 sends a segmentation data rotation command to the segmentation data rotator 35 to rotate the segmentation data. The segmentation data rotator 35 rotates the segmentation data through operations of writing the segmentation data in the segmentation data memory 34 and reading out the data therefrom.

The segmentation data expander 36 expands the compressed segmentation data input by a decompressing method corresponding to the method used to compress the image data, for example, Huffman decoding, and outputs the expanded segmentation data to the selector 37. When the segmentation data has not been compressed, the system controller 71 controls the selector 37 to output the data input from the segmentation data memory 34, and when the image data has been compressed, the system controller 71 controls the selector 37 to output the data input from the segmentation data expander 36.

The image converter 19 processes the image data according to the segmentation data input from a signal line 37b. In other words, the segmented areas, i.e., the text areas, the screened halftone image areas and the continuous tone image areas of the image data, respectively, are processed differently. As an example, a color correcting operation and a special filtering operation are processed differently. The image converter 19 also converts the image data according to the editing data input from the editing memory 50 via a signal line 50a. As an example, an image trimming operation and a color change operation are performed.

FIG. 12 is a table illustrating a relationship between output image sizes and data compression methods for each of image data, segmentation data and editing data, employed in the image processing apparatus 11. Referring to FIG. 12, output image sizes are divided into three groups according to the output image size. The first group of output image sizes includes small sizes such as, for example, the A6 size and sizes smaller than the A6 size, and data compression is not applied to image data, segmentation data and editing data in this group for saving a data compression and expansion time. The second group of output image sizes includes medium sizes larger than the A6 size and smaller than the A3 size, such as, for example, the A5 size and the A4 size, and a fixed-length data compression method such as, for example, the BTC method is applied to image data in this group for reducing the data size while maintaining image rotating operability, and data compression is not applied to segmentation data and editing data of the second group for saving a data compression and expansion time and for maintaining high fidelity of an image reproduction and accuracy of an image editing when the segmentation data and the editing data are rotated.

The third group of output image sizes includes large sizes larger than the A4 size such as, for example, the A3 size, and because image data in the group is not required to be rotated, a variable-length data compression method having a compression ratio higher than a fixed-length compression method, such as, for example, the JPEG method, is applied to image data in this group for further reducing the data size, and a reversible variable-length data compression method such as, for example, the Huffman encoding method is applied to segmentation data and editing data in this group for reducing the data size while maintaining high fidelity of an image reproduction and accuracy of an image editing.

Thus, when the output image size belongs to the third group, the segmentation data and the editing data are compressed with a high compression ratio such as, for example, 0.5.

In this embodiment, the editing data memory 50 is configured to have a capacity to store a larger one of two editing data, editing data of an output image in the smaller and medium size (first and second) groups, which is not compressed, and editing data of an output image in the large size group (third group), which is compressed by the reversible variable-length data compression. More specifically, editing data of an A3 size output document, for example, with 400 dots per inch (dpi) resolution, has a capacity of about 16 megabytes, and likewise, editing data of an A4 size output document has a capacity of about 8 megabytes. In this embodiment, editing data of an A3 size output document belonging to the third group of image sizes is compressed by the reversible variable-length data compression method with a maximum compression ratio of 0.5, and thereby the compressed data size becomes 8 megabytes at most, while editing data of an A4 size output document belonging to the second group of image sizes is not compressed, and thereby the data size is 8 megabytes. Accordingly, the editing data memory 50 is configured to have a capacity of 8 megabytes so that either one of the editing data of an output image in the second group which is not compressed and the editing data of an output image in the third group which is compressed with the reversible variable-length data compression method can be stored.

Similarly, the segmentation data memory 34 is configured to have a capacity for storing the largest one of two segmentation data, segmentation data of an output image in the first or second group of FIG. 12, which is not compressed, and segmentation data of an output image in the third group, which is compressed by the reversible variable-length data compression. More specifically, segmentation data of an A3 size output document, for example, with 400 dots per inch (dpi) resolution, has a capacity of about 8 megabytes. Likewise, segmentation data of an A4 size output document has a capacity of about 4 megabytes and segmentation data of an A6 size output document has a capacity of about 1 megabyte. In this embodiment, segmentation data of an A3 size output document, which belongs to the third group of image sizes, is compressed by the reversible variable-length data compression method with a maximum compression ratio of 0.5, and thereby the compressed data size becomes 4 megabytes at most. Segmentation data of an A4 size output document, which belongs to the second group of image sizes is not compressed, and thereby the data size is 4 megabytes. Accordingly, the segmentation data memory 34 is configured to have a capacity of 4 megabytes such that either one of the segmentation data, segmentation data of an output image in the first and second groups of image sizes, which is not compressed, and the segmentation data of an output image in the third group of image sizes, which is compressed with the reversible variable-length data compression method, can be stored.

Figure 13:
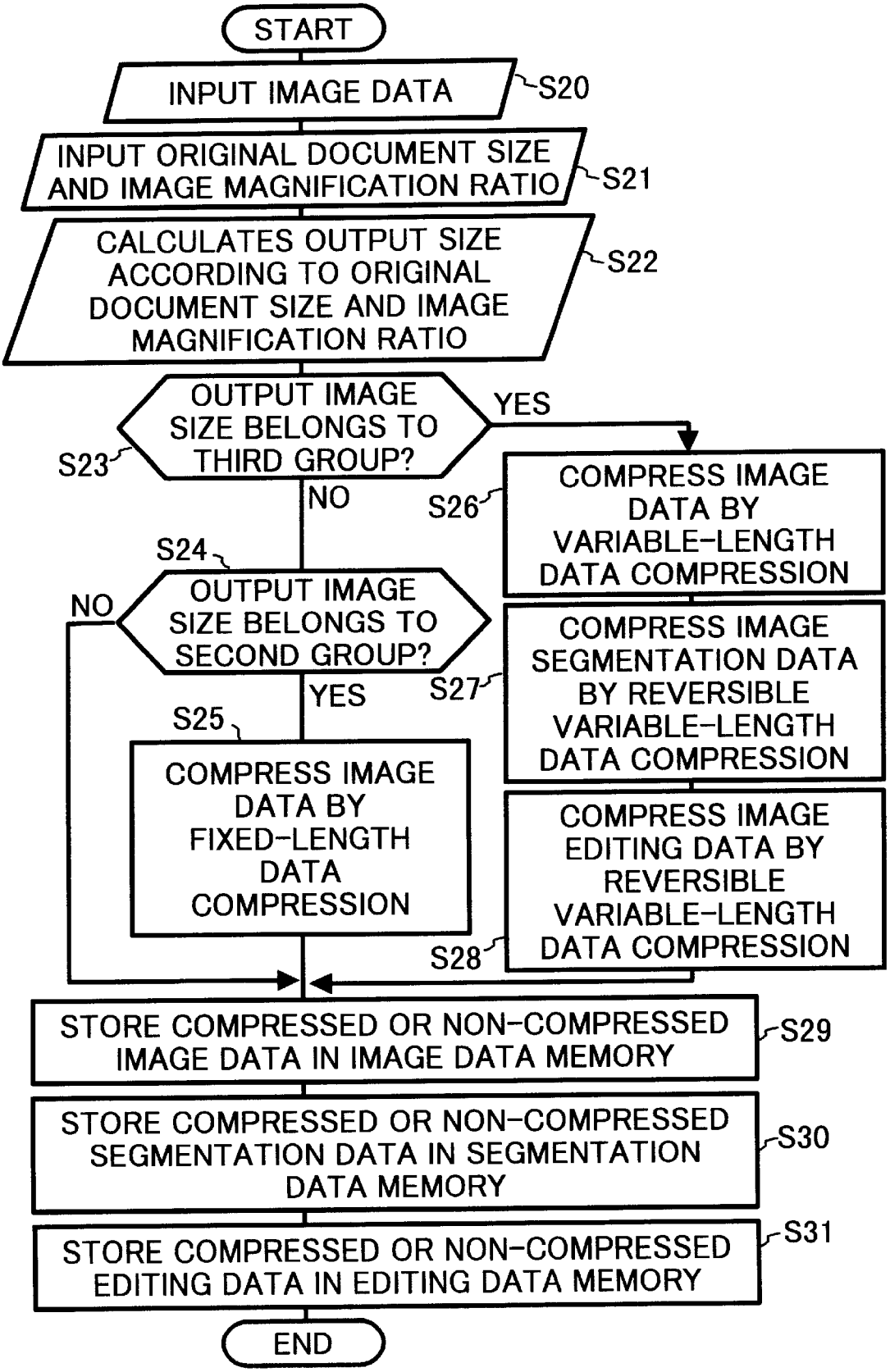
FIG. 13 is a flowchart illustrating operational steps for practicing one the image data compression methods in the image processing apparatus of FIG. 11.

FIG. 13 is a flowchart illustrating operational steps for executing one of the image data compression methods in the image processing apparatus 11. Referring to FIG. 13, in step S20, the image data compressor 12 inputs image data received from the external image input device 91. In step S21, the system controller 71 inputs an original document size and an image magnification ratio via the operation panel 72. In step S22, the system controller 71 calculates the output image size.

In Step S23, the system controller 71 judges whether the output image size belongs to the third group in the table of FIG. 12. When the output image size belongs to the third group, the process proceeds to step S26. In the step S26, the image data compressor 12 compresses the input image data by the variable-length data compression method such as, for example, the JPEG method. In step S27, the segmentation data compressor 32 compresses the segmentation data by the reversible variable-length data compression method such as, for example, the Huffman encoding method. In step S28, the system controller 71 compresses the editing data by the reversible variable-length data compression method such as, for example, the Huffman encoding method. The process proceeds to step S29.

In the step S23, when the output image size does not belong to the third group, the process proceeds to step S24. In the Step S24, the system controller 71 judges whether the output image size belongs to the second group in the table of FIG. 12. When the output image size belongs to the second group, the process proceeds to step S25, and when the output image size does not belong to the second group, the process proceeds to step S29. In the step S25, the image data compressor 12 compresses the input image data by the fixed-length data compression method such as, for example, the BTC method. In the step S29, the compressed or non-compressed image data is stored in the image data memory 14. In step S30, the compressed or non-compressed segmentation data is stored in the segmentation data memory 34. In step S31, the compressed or non-compressed editing data is stored in the editing data memory 50.

Figure 14:
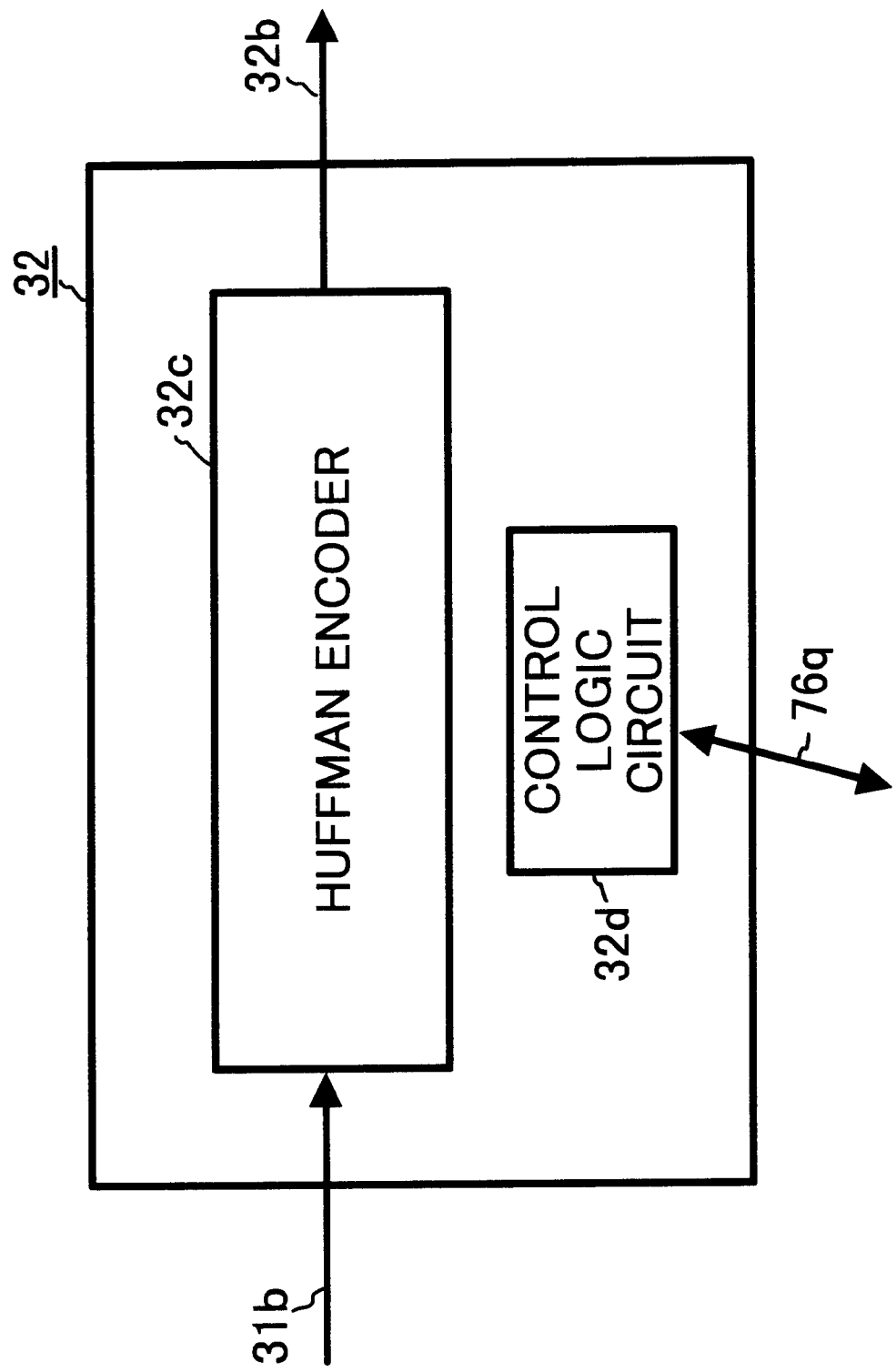
FIG. 14 is a schematic block diagram illustrating a structure of the segmentation data compressor 32 of FIG. 11.

FIG. 14 is a schematic block diagram illustrating a structure of the segmentation data compressor 32 of FIG. 11. In FIG. 14, the segmentation data compressor 32 includes a Huffman encoding device 32c and a control logic circuit 32d. When image data in the third group of image sizes in FIG. 12 is input, the Huffman encoding device 32c compresses the segmentation data by reversible variable-length data compression.

As described above, in the image processing apparatus 11, the capacity of the image data memory 14 is decreased in a similar manner as the image processing apparatus 10 in the previous embodiment. Also, segmentation data and editing data in the third group of image sizes are compressed by the reversible variable-length data compression having a maximum compression ratio of 0.5, and thereby the capacity of the segmentation data memory 34 and the editing data memory 50, respectively, are decreased. Further, image data in the first group of image sizes, the segmentation data and the editing data both in the first and second groups of image sizes are not compressed. Therefore, the image processing time for small and medium size images is decreased and the image processing apparatus 11 swiftly accomplishes the image rotating operation of the image data, the segmentation data and the editing data in the first and second groups of the image size.

Figure 15:
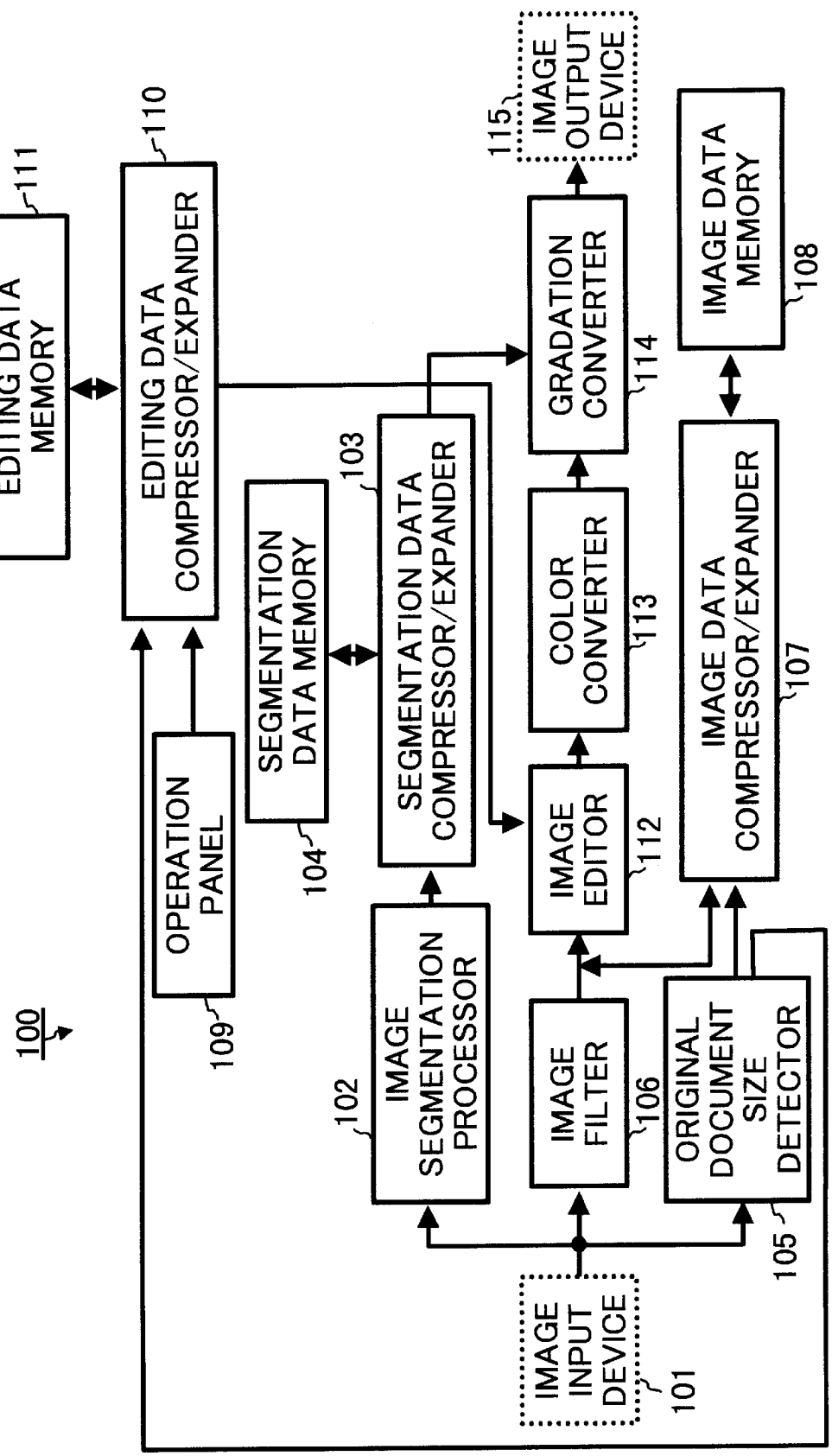
FIG. 15 is a schematic block diagram illustrating a structure of an image processing apparatus according to a third embodiment of the present invention.

FIG. 15 is a schematic block diagram illustrating a structure of an image processing apparatus 100 according to a third embodiment of the present invention. Referring to FIG. 15, the image processing apparatus 100 includes an image segmentation processor 102, a segmentation data compressor/expander 103, a segmentation data memory 104, an original document size detector 105, an image filter 106, an image data compressor/expander 107, an image data memory 108, an operation panel 109, an editing data compressor/expander 110, an editing data memory 111, an image editor 112, a color converter 113 and a gradation converter 114. In this embodiment, the image processing apparatus 100 connects to an external image-input device 101 such as, for example, an image scanner and an external image-output device 115 such as, for example, a laser printer, which is configured to output an A4 size print and a smaller size print either in landscape or in portrait orientation and a print larger than the A4 size only in landscape orientation. The combined system of the image processing apparatus 100, the image-input device 101 and the image-output device 115 functions, for example, as a color photocopier.

In this embodiment, the image processing apparatus 100 applies the relationship between output image sizes and data compression methods for each of the image data, the segmentation data and the editing data of FIG. 12.

Referring to FIG. 15, the image filter 106 filters input image data for decreasing moire fringes. The original document size detector 105 detects the size of an original document, which is inputted by the external image-input device 101, using input image data. The original document size detector 105 also determines an output image size for the image output device 115 according to the original document size which is detected by the original document size detector 105 and an image magnification ratio which is input from the operation panel 109. When an image rotation command is input from the operation panel 109, the original document size detector 105 judges whether the output print size is a rotatable size, that is, whether the output print size is the A4 size or smaller. When the output image size is the A4 size or smaller and when a rotation instruction is input via an operation panel 109, the original document size detector 105 sends a rotation signal to the image data compressor/expander 107 and the editing data compressor/expander 110.

The image segmentation processor 102 separates the image data input from the image input device 101 into text areas, screened halftone image areas and continuous tone image areas. The result data of the separating operation, i.e., segmentation data, is output to the segmentation data compressor/expander 103.

When the output print size is larger than the A4 size, the segmentation data compressor/expander 103 compresses the segmentation data by a reversible and variable-length data compression method, such as, for example, the Huffman encoding method. The compression ratio of the reversible variable-length data compression method is varied according to contents of data; however, in this embodiment, the compression ratio is set to a maximum of 0.5. The segmentation data memory 104 stores either the compressed or the non-compressed segmentation data. The segmentation data memory 104 has a capacity of 4 megabytes to store either one of the segmentation data in the first and second groups of image sizes, which is not compressed, and the segmentation data in the third group of image sizes, which is compressed with the reversible variable-length data compression method.

The gradation converter 114 converts the gradation of the input image into another gradation according to the segmentation data.

The image data compressor/expander 107 compresses the image data according to the output print size sent from the original document size detector 105. When the output print size is small and is one of the first group of output image sizes of FIG. 12, such as, for example, the A6 size, the image data compressor/expander 107 does not compress the input image data. When the output print size is a medium size and is one of the second group of output image sizes, such as, for example, the A4 size or the A5 size, the image data compressor/expander 107 compresses the input image data by a fixed-length data compression method, such as, for example, the BTC method. When the output print size is a large size, such as, for example, the A3 size and is one of the third group of output image sizes, the image data compressor/expander 107 compresses the input image data by a variable-length data compression method, such as, for example, the JPEG method. The compression ratio of the variable-length data compression method is varied according to contents of image data; however in this embodiment, the compression ratio is set to a maximum of 0.4. The compression ratio of the fixed-length data compression method in this embodiment is set to 0.6.

The image data memory 108 has a capacity of 38.4 megabytes to store one of the image data in the first group of image sizes, which is not compressed, the image data in the second group of image sizes, which is compressed with the fixed-length data compression method, and the image data in the third group of image sizes, which is compressed with the variable-length data compression method.

The operation panel 109 has a display panel for displaying the input image, and the operator of the apparatus 100 can input editing commands, such as an image trimming command. The operation panel 109 converts the input editing commands into editing data and sends the editing data to the editing data compressor/expander 110. When the output print size is one of the third group of output image sizes, the editing data compressor/expander 110 compresses the editing data by a reversible and variable-length data compression method such as, for example, the Huffman encoding method, which is also applied to the segmentation data compression. The editing data memory 111 stores either the compressed or the non-compressed editing data. The editing data memory 111 has a capacity of 8 megabytes to store either one of the editing data of the first and second groups of image sizes, which is not compressed, and the editing data of the third group of image sizes, which is compressed with the reversible variable-length data compression method. The image editor 112 coverts the input image data into another image data according to the editing data. For example, the color converter 113 converts red, green and blue image data into cyan, magenta, yellow and black image data for printing.

As described above, in the image processing apparatus 100, the capacity of the image data memory 108, the capacity of the segmentation data memory 104 and the capacity of the editing data memory 111 are decreased.

In the above-described embodiment, image data, segmentation data and editing data are compressed according to an output image size, however these data can be compressed also according to the size of an image of an original document, which is inputted to the external image-input device. FIG. 16 is a table illustrating a relationship between input image sizes and data compression methods for each of image data, segmentation data and editing data for the inputted image. The table can be employed in the image processing apparatus 11 of FIG. 11 and the image processing apparatus 100 of FIG. 15. Referring to FIG. 16, the input image sizes are divided into three groups according to the input image size. The first group of input image sizes includes small sizes such as, for example, the A6 size and smaller, for which none of image data, segmentation data and editing data of the group is compressed. The second group of input image sizes includes medium sizes, such as, for example, the A5 size and the A4 size, and image data of the group is compressed by a fixed-length data compression method such as, for example, the BTC method, and segmentation data and editing data of the group are not compressed.

The third group of input image sizes includes large sizes such as, for example, the A3 size, and image data of the group is compressed by a variable-length data compression method such as, for example, the JPEG method, and segmentation data and editing data of the group are compressed, for example, by the Huffman encoding method. The Huffman encoding method for the segmentation data and the editing data is a reversible and variable-length data compression method. Thus, when the input image size belongs to the third group, the segmentation data and the editing data are compressed with a high compression ratio.

Figure 17:
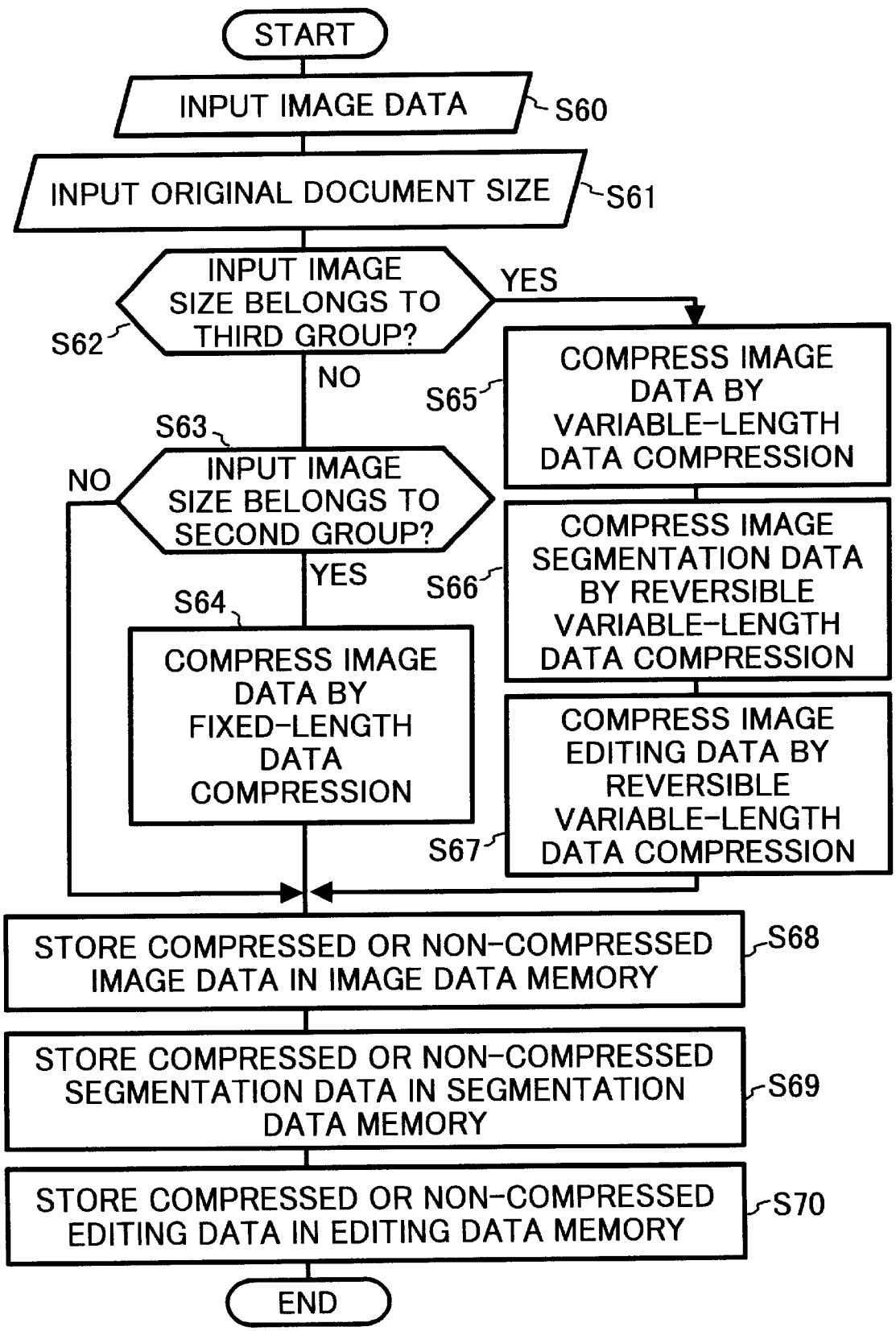
FIG. 17 is a flowchart illustrating alternative operational steps for practicing one the image data compression methods in the image processing apparatus of FIG. 11.

FIG. 17 is a flowchart illustrating operational steps for executing one of the image data compression methods in the image processing apparatus 11 according to the table of FIG. 16. Referring to FIG. 17, after starting, in step S60, the image data compressor 12 inputs image data received from an external inputting device. In Step S61, the system controller 71 inputs information of an original document size received from the operation panel 72. In Step S62, the system controller 71 judges whether the input image size belongs to the third group in the table of FIG. 16. When the input image size belongs to the third group, the process proceeds to step S65. In the step S65, the image data compressor 12 compresses the input image data by the variable-length data compression method such as, for example, the JPEG method. In step S66, the segmentation data compressor 32 compresses the segmentation data by the reversible variable-length data compression method such as, for example, the Huffman encoding method. In step S67, the system controller 71 compresses the editing data by the reversible variable-length data compression method such as, for example, the Huffman encoding method. The process proceeds to step S68.

In the step S62, when the input image size does not belong to the third group, the process proceeds to step S63. In the Step S63, the system controller 71 judges whether the input image size belongs to the second group in the table of FIG. 16. When the input image size belongs to the second group, the process proceeds to step S64, and when the input image size does not belong to the second group, the process proceeds to step S68. In the step S64, the image data compressor 12 compresses the input image data by the fixed-length data compression method such as, for example, the BTC method. In the step S68, the compressed or non-compressed image data is stored in the image data memory 14. In step S69, the compressed or non-compressed segmentation data is stored in the segmentation data memory 34. In step S70, the compressed or non-compressed editing data is stored in the editing data memory 50.

As described above, the image processing method and apparatus having a function of data compression of the present invention are capable of decreasing a capacity of an image data memory and decreasing an image processing time.

Further, the image processing method and apparatus having a function of data compression of the present invention are capable of decreasing a capacity of an editing data memory and decreasing an image processing time.

Furthermore, the image processing method and apparatus having a function of data compression of the present invention are capable of decreasing a capacity of an image segmentation data memory and decreasing an image processing time.

Obviously, numerous additional modifications and variations of the present invention are possible in light of the above teachings. In particular, features described for certain embodiments may be employed in a logical manner to other embodiments described herein. It is therefore to be understood that within the scope of the appended claims, the present invention may be practiced otherwise than as specifically described herein.

This document is based on Japanese patent application No. 10-268508 filed in the Japanese Patent Office on Sep. 22, 1998, the entire contents of which are hereby incorporated by reference.

What is claimed as new and desired to be secured by Letters Patent of the United States is:

1. An image processing apparatus for inputting image data from an external image inputting device and outputting the inputted image data to an external image output device after processing the data, the image processing apparatus comprising:

data compression means for compressing the inputted image data by a variable-length data compression method;

data storing means for storing the inputted image data; and means for controlling the apparatus, wherein the data compression means compresses the inputted image data by the variable-length data compression method and the data storing means stores the compressed image data when a size of an output image of the inputted image data is larger than a predetermined size, and the data storing means stores the inputted image data without data compression when the size of the output image of the inputted image data is one of equal to and smaller than the predetermined size.

2. The image processing apparatus according to claim 1, wherein the inputted image data is rotated.

3. The image processing apparatus according to claim 1, wherein image data of the output image having a size which is one of equal to and smaller than the predetermined size is selectively rotated, and image data of the output image having a size larger than the predetermined size is not rotated.

4. An image processing apparatus for inputting image data from an external image inputting device and outputting the inputted image data to an external image outputting device after processing the data, the image processing apparatus comprising:

means for compressing the inputted image data by one of a variable-length data compression method and a fixed-length data compression method;

means for storing the inputted image data therein; and means for controlling the apparatus, wherein the data compression means compresses the inputted image data by the variable-length data compression method and the data storing means stores the compressed image data therein, when a size of an output image of the inputted image data is larger than a first predetermined size, the data compression means compresses the inputted image data by the fixed-length data compression method and the data storing means stores the compressed image data therein, when the size of the output image of the inputted image data is one of equal to and smaller than the first predetermined size, and larger than a second predetermined size, and the data storing means stores original image data therein without data compression, when the size of the output image of the inputted image data is one of equal to and smaller than the second predetermined size.

5. The image processing apparatus according to claim 4, wherein the inputted image data is rotated.

6. An image processing apparatus for inputting image data from an external image inputting device and outputting the inputted image data to an external image outputting device after processing the data, the image processing apparatus comprising:

means for generating image segmentation information from the inputted image data;

means for compressing the image segmentation information by a variable-length data compression method;

means for storing the image segmentation information therein;

means for processing the inputted image data according to the image segmentation information; and means for controlling the apparatus, wherein the image segmentation information compression means compresses the image segmentation information by the variable-length data compression method and the image segmentation information storing means stores the compressed image segmentation information therein, when a size of an output image of the inputted image data is larger than a predetermined size, and the image segmentation information storing means stores the image segmentation information therein without compression, when the size of the output image of the inputted image data is one of equal to and smaller than the predetermined size.

7. The image processing apparatus according to claim 6, wherein the inputted image data is rotated.

8. The image processing apparatus according to claim 6, wherein image data of the output image having one of the predetermined size and a size smaller than the predetermined size is selectively rotated and image data of the output image having a size larger than the predetermined size is not rotated.

9. The image processing apparatus according to claim 6, wherein the variable-length data compression method comprises a reversible data compression method.

10. An image processing apparatus for inputting image data from an external image inputting device and outputting the inputted image data to an external image outputting device after processing the data, the image processing apparatus comprising:

means for inputting image editing information for editing the inputted image data;

means for compressing the image editing information by a variable-length data compression method;

means for storing the image editing information;

means for processing the inputted image data according to the image editing information; and means for controlling the apparatus, wherein the image editing information compression means compresses the image editing information by the variable-length data compression method and the image editing data storing means stores the compressed image editing information therein, when a size of an output image of the inputted image data is larger than a predetermined size, and the image editing information storing means stores the image editing information therein without compression, when the size of the output image of the inputted image data is one of equal to and smaller than the predetermined size.

11. The image processing apparatus according to claim 10, wherein the inputted image data is rotated.

12. The image processing apparatus according to claim 10, wherein image data of the output image having a size which is one of equal to and smaller than the predetermined size is selectively rotated, and image data of the output image having a size larger than the predetermined size is not rotated.

13. The image processing apparatus according to claim 10, wherein the variable-length data compression method comprises a reversible data compression method.

14. An image processing apparatus for inputting image data from an external image inputting device and outputting the inputted image data to an external image outputting device after processing the data, the image processing apparatus comprising:

means for compressing the inputted image data by a variable-length data compression method;

means for storing the inputted image data therein; and means for controlling the apparatus, wherein the data compression means compresses the inputted image data by the variable-length data compression method and the data storing means stores the compressed image data therein, when a size of an input image of the inputted image data is larger than a predetermined size, and the data storing means stores the inputted image data therein without data compression, when the input image of the inputted image data is one of equal to and smaller than the predetermined size.

15. An image processing apparatus for inputting image data from an external image inputting device and outputting the inputted image data to an external image outputting device after processing the data, the image processing apparatus comprising:

means for compressing the inputted image data by one of a variable-length data compression method and a fixed-length data compression method;

means for storing the inputted image data therein; and means for controlling the apparatus, wherein the data compression means compresses the inputted image data by the variable-length data compression method and the data storing means stores the compressed image data therein, when a size of an input image of the inputted image data is larger than a first predetermined size, the data compression means compresses the inputted image data by the fixed-length data compression method and the data storing means stores the compressed image data therein, when the size of the input image of the inputted image data is one of equal to and smaller than the first predetermined size, and larger than a second predetermined size, and the data storing means stores the original image data therein without data compression, when the size of the input image of the inputted image data is one of equal to and smaller than the second predetermined size.

16. An image processing apparatus for inputting image data from an external image inputting device and outputting the inputted image data to an external image outputting device after processing the data, the image processing apparatus comprising:

an image data compressor for compressing the inputted image data by a variable-length data compression method;

an image data memory for storing the inputted image data therein; and a system controller for controlling the apparatus, wherein the image data compressor compresses the inputted image data by the variable-length data compression method and the image data memory stores the compressed image data therein, when a size of an output image of the inputted image data is larger than a predetermined size, and the image data memory stores the inputted image data therein without data compression when the size of the output image of the inputted image data is one of equal to and smaller than the predetermined size.

17. The image processing apparatus according to claim 16, wherein the inputted image data is rotated.

18. The image processing apparatus according to claim 16, wherein image data of the output image having a size which is one of equal to and smaller than the predetermined size is selectively rotated, and image data of the output image having a size larger than the predetermined size is not rotated.

19. An image processing apparatus for inputting image data from an external image inputting device and outputting the inputted image data to an external image outputting device after processing the data, the image processing apparatus comprising:

an image data compressor for compressing the inputted image data by one of a variable-length data compression method and a fixed-length data compression method;

an image data memory for storing the inputted image data therein; and a system controller for controlling the apparatus, wherein the image data compressor compresses the inputted image data by the variable-length data compression method and the image data memory stores the compressed image data therein, when a size of an output image of the inputted image data is larger than a first predetermined size, the image data compressor compresses the inputted image data by the fixed-length data compression method and the image data memory stores the compressed image data therein, when the size of the output image of the inputted image data is one of equal to and smaller than the first predetermined size, and larger than a second predetermined size, and the image data memory stores the original image data therein without data compression when the size of the output image of the inputted image data is one of equal to and smaller than the second predetermined size.

20. The image processing apparatus according to claim 19, wherein the inputted image data is rotated.

21. An image processing apparatus for inputting image data from an external image inputting device and outputting the inputted image data to an external image outputting device after processing the data, the image processing apparatus comprising:

an image segmentation processor for generating image segmentation information from the inputted image data;

an image segmentation information compressor for compressing the image segmentation information by a variable-length data compression method;

an image segmentation information memory for storing the image segmentation information therein;

an image data processor for processing the inputted image data according to the image segmentation information; and a system controller for controlling the apparatus, wherein the image segmentation information compressor compresses the image segmentation information by the variable-length data compression method and the image segmentation information memory stores the compressed image segmentation information therein, when a size of an output image of the inputted image data is larger than a predetermined size, and the image segmentation information memory stores the image segmentation information therein without data compression when the size of the output image of the inputted image data is one of equal to and smaller than the predetermined size.

22. An image processing apparatus for inputting image data from an external image inputting device and outputting the inputted image data to an external image outputting device after processing the data, the image processing apparatus comprising:

an image editing information inputting device for inputting image editing information for editing the inputted image data;

an image editing information compressor for compressing the image editing information by a variable-length data compression method;

an image editing information memory for storing the image editing information therein;

an image data processor for processing the inputted image data according to the image editing information; and a system controller for controlling the apparatus, wherein the image editing information compressor compresses the image editing information by the variable-length data compression method and the image editing information memory stores the compressed image editing information therein, when a size of an output image of the inputted image data is larger than a predetermined size, and the image editing information memory stores the image editing information therein without data compression when the size of the output image of the inputted image data is one of equal to and smaller than the predetermined size.

23. A method for processing image data, comprising the steps of:

inputting image data from an external image inputting device;

determining a size of an output image of the inputted image data;

compressing the inputted image data by a variable-length data compression method and storing the compressed image data when the size of the output image of the inputted image is larger than a predetermined size, and storing the inputted image data without data compression when the size of the output image of the inputted image is one of equal to and smaller than the predetermined size.

24. The method according to claim 23, further comprising the step of:

rotating the inputted image data.

25. The method according to claim 23, wherein
image data of the output image having a size which is one of equal to and smaller than the predetermined size is selectively rotated, and
image data of the output image having a size larger than the predetermined size is not rotated.

26. A method for processing image data, comprising the steps of:
inputting image data from an external image inputting device;
determining a size of an output image of the inputted image data;
compressing the inputted image data by a variable-length data compression method and storing the compressed image data when the size of the output image of the inputted image is larger than a first predetermined size;
compressing the inputted image data by a fixed-length data compression method and storing the compressed image data when the size of the output image of the inputted image data is one of equal to and smaller than the first predetermined size and larger than a second predetermined size; and
storing the inputted image data without data compression when the size of the output image of the inputted image is one of equal to and smaller than the second predetermined size.

27. The method according to claim 26, further comprising the step of:
rotating the inputted image data.

28. A method for processing image data, comprising the steps of:
inputting image data from an external image inputting device;
determining a size of an output image of the inputted image data;
generating image segmentation information from the inputted image data;
compressing the image segmentation information by a variable-length data compression method and storing the compressed image segmentation information when the size of the output image of the inputted image is larger than a predetermined size; and
storing the image segmentation information without data compression when the size of the output image of the inputted image is one of equal to and smaller than the predetermined size.

29. A method for processing image data, comprising the steps of:
inputting image data from an external image inputting device;
determining a size of an output image of the inputted image data;
inputting editing information to edit the inputted image data;
compressing the inputted editing information by a variable-length data compression method and storing the compressed editing information when the size of the output image of the inputted image is larger than a predetermined size; and
storing the inputted editing information without data compression when the size of the output image of the inputted image is one of equal to and smaller than the predetermined size.

30. A computer readable medium storing instructions for processing image data by performing the steps of:
inputting image data from an external image inputting device;
determining a size of an output image of the inputted image data;
compressing the inputted image data by a variable-length data compression method and storing the compressed image data when the size of the output image of the inputted image is larger than a predetermined size; and
storing the inputted image data without data compression when the size of the output image of the inputted image is one of equal to and smaller than the predetermined size.

31. The computer readable medium according to claim 30, further comprising the step of:
rotating the inputted image data.

32. The computer readable medium according to claim 30, wherein
image data of the output image having a size which is one of equal to and smaller than the predetermined size is selectively rotated, and
image data of the output image having a size larger than the predetermined size is not rotated.

33. A computer readable medium storing instructions for processing image data by performing the steps of:
inputting image data from an external image inputting device;
determining a size of an output image of the inputted image data;
compressing the inputted image data by a variable-length data compression method and storing the compressed image data when the size of the output image of the inputted image is larger than a first predetermined size;
compressing the inputted image data by a fixed-length data compression method and storing the compressed image data when the size of the output image of the inputted image data is one of equal to and smaller than the first predetermined size and larger than a second predetermined size; and
storing the inputted image data without data compression when the size of the output image of the inputted image is one of equal to and smaller than the second predetermined size.

34. The computer readable medium according to claim 33, further comprising the step of:
rotating the inputted image data.

35. A computer readable medium storing instructions for processing image data by performing the steps of:
inputting image data from an external image inputting device;
determining a size of an output image of the inputted image data;
generating image segmentation information from the inputted image data;
compressing the image segmentation information by a variable-length data compression method and storing the compressed image segmentation information when the size of the output image of the inputted image is larger than a predetermined size; and
storing the image segmentation information without data compression when the size of the output image of the inputted image is one of equal to and smaller than the predetermined size.

36. A computer readable medium storing instructions for processing image data by performing the steps of:

inputting image data from an external image inputting device;

determining a size of an output image of the inputted image data;

inputting editing information for editing the inputted image data;

compressing the inputted editing information by a variable-length data compression method and storing the compressed editing information when the size of the output image of the inputted image is larger than a predetermined size; and storing the inputted editing information without data compression when the size of the output image of the inputted image is one of equal to and smaller than the predetermined size.

* * * * *